United States Patent
Dunn et al.

(10) Patent No.: US 12,555,992 B2
(45) Date of Patent: Feb. 17, 2026

(54) POWER DISTRIBUTION DEVICE WITH A THERMAL COMPONENT

(71) Applicant: Rivian IP Holdings, LLC, Plymouth, MI (US)

(72) Inventors: Casey Dunn, Mission Viejo, CA (US); Brandon Thayer, Aliso Viejo, CA (US)

(73) Assignee: Rivian IP Holdings, LLC, Irvine, CA (US)

( * ) Notice: Subject to any disclaimer, the term of this patent is extended or adjusted under 35 U.S.C. 154(b) by 718 days.

(21) Appl. No.: 17/882,990

(22) Filed: Aug. 8, 2022

(65) Prior Publication Data
US 2024/0047955 A1    Feb. 8, 2024

(51) Int. Cl.
*H02G 5/10*    (2006.01)
*B60R 16/023*    (2006.01)

(52) U.S. Cl.
CPC ........... *H02G 5/10* (2013.01); *B60R 16/0238* (2013.01)

(58) Field of Classification Search
CPC .............................. H02G 5/10; B60R 16/0238
USPC ........................................................ 361/624
See application file for complete search history.

(56) References Cited

U.S. PATENT DOCUMENTS

| | | | | |
|---|---|---|---|---|
| 2,870,240 A | * | 1/1959 | Stieglitz | H02G 5/06 174/99 B |
| 2,879,366 A | * | 3/1959 | Tudbury | H05B 6/36 336/62 |
| 3,621,108 A | * | 11/1971 | Cleaveland | H02G 5/10 174/15.6 |
| 3,764,765 A | * | 10/1973 | Olashaw | H02B 1/56 361/676 |
| 3,829,647 A | * | 8/1974 | Cleaveland | H02G 5/10 165/182 |
| 3,879,100 A | * | 4/1975 | Chabot | H02B 1/56 165/182 |
| 3,958,093 A | * | 5/1976 | Cleaveland | H02B 11/167 218/118 |
| 4,005,297 A | * | 1/1977 | Cleaveland | H01H 1/62 174/15.2 |
| 4,945,188 A | * | 7/1990 | Jackson | H02G 5/002 174/70 B |
| 5,902,156 A | * | 5/1999 | Geebelen | H02B 1/205 439/177 |
| 5,930,135 A | * | 7/1999 | Janko | F28F 13/00 165/104.33 |
| 6,294,978 B1 | * | 9/2001 | Endo | H01H 85/044 337/159 |
| 6,574,094 B1 | * | 6/2003 | Morrow | H02G 5/10 361/699 |
| 7,253,379 B2 | * | 8/2007 | Lakner | F28D 15/02 219/494 |
| 7,952,856 B2 | * | 5/2011 | Otsuka | H05K 7/14322 361/624 |
| 8,240,411 B2 | * | 8/2012 | Nakatsu | H05K 7/209 361/689 |

(Continued)

*Primary Examiner* — Anatoly Vortman
(74) *Attorney, Agent, or Firm* — Foley & Lardner LLP

(57) ABSTRACT

A power distribution device with an electric component is provided. The device can include a busbar. The device can include a thermal component coupled to the busbar to dissipate heat generated at the busbar. The device can include a material molded over at least a portion of the thermal component to electrically isolate at least the portion of the thermal component from the busbar.

20 Claims, 14 Drawing Sheets

(56) References Cited

U.S. PATENT DOCUMENTS

| | | | | |
|---|---|---|---|---|
| 8,711,549 B2* | 4/2014 | Rodrigues | | H02G 5/10 |
| | | | | 174/68.2 |
| 9,001,499 B2* | 4/2015 | Kolberg | | H01H 9/52 |
| | | | | 361/678 |
| 9,736,967 B2* | 8/2017 | Molitor | | H05K 7/20218 |
| 9,906,001 B2* | 2/2018 | Karandikar | | H02B 1/56 |
| 10,153,629 B2* | 12/2018 | Greenwood | | H02G 5/10 |
| 10,270,231 B2* | 4/2019 | Pal | | H01H 1/62 |
| 10,712,102 B2* | 7/2020 | Takken | | F28F 3/04 |
| 11,696,420 B2* | 7/2023 | Kittur | | H01H 71/08 |
| | | | | 361/678 |
| 11,927,398 B2* | 3/2024 | Kessler | | H02G 5/10 |
| 12,171,086 B2* | 12/2024 | Bhagat | | H05K 7/20381 |
| 2003/0106785 A1* | 6/2003 | Bach | | H01H 71/08 |
| | | | | 200/51.1 |
| 2008/0049384 A1* | 2/2008 | Unternaehrer | | H02G 5/10 |
| | | | | 361/677 |
| 2010/0302715 A1* | 12/2010 | Bortoli | | H02B 1/56 |
| | | | | 361/689 |
| 2010/0319876 A1* | 12/2010 | Yoshida | | H01L 23/345 |
| | | | | 165/80.2 |
| 2011/0180292 A1* | 7/2011 | Widmer | | H02G 5/10 |
| | | | | 174/15.2 |
| 2012/0113569 A1* | 5/2012 | Peralta | | H02B 1/56 |
| | | | | 174/548 |
| 2013/0250490 A1* | 9/2013 | Kaufmann | | H01H 9/52 |
| | | | | 361/677 |
| 2013/0258557 A1* | 10/2013 | Dhar | | H02B 1/56 |
| | | | | 361/622 |
| 2014/0356671 A1* | 12/2014 | Dawley | | H01M 50/569 |
| | | | | 429/90 |
| 2015/0124381 A1* | 5/2015 | Wu | | H02G 5/10 |
| | | | | 361/677 |
| 2015/0156896 A1* | 6/2015 | Jeong | | H05K 5/0047 |
| | | | | 361/796 |
| 2016/0006088 A1* | 1/2016 | Boetcher | | F28D 20/02 |
| | | | | 165/80.2 |
| 2019/0165601 A1* | 5/2019 | Supriya | | H01H 9/52 |
| 2019/0204023 A1* | 7/2019 | Takken | | F28F 3/04 |
| 2019/0350107 A1* | 11/2019 | Cader | | H05K 7/20509 |
| 2021/0319933 A1* | 10/2021 | Beaupre | | H01B 13/16 |
| 2023/0018694 A1* | 1/2023 | Kessler | | H01H 9/52 |
| 2023/0106775 A1* | 4/2023 | Chen | | H01M 50/124 |
| | | | | 429/174 |
| 2023/0180443 A1* | 6/2023 | Costello | | H05K 7/1492 |
| | | | | 361/699 |
| 2024/0047955 A1* | 2/2024 | Dunn | | B60R 16/0238 |

* cited by examiner

POWER DISTRIBUTION DEVICE WITH A THERMAL COMPONENT

INTRODUCTION

A vehicle, such as an electric vehicle, can be powered by batteries. The vehicle can include components that operate the vehicle based on power provided by the batteries.

SUMMARY

This disclosure is generally directed to a power distribution device with a thermal component, such as a power distribution box in an electric vehicle. A distribution box can be an electrical gateway into or out of a battery pack of the electric vehicle. The distribution box can include busbars. The busbars can electrically connect with the battery cells of the vehicle, the loads of the vehicle, or external power sources from which the vehicle can charge. The busbars can increase in temperature due to current carried by the busbar based on a voltage applied to the busbars (e.g., a constant voltage or a duty cycle of voltage). The distribution box can include at least one thermal component, such as a plate or cold plate, over-molded with at least one material. The material can be an electrically isolating material such as a plastic. The electrically isolating material can be molded over a portion, or an entirety, of an outer surface of the thermal component. The thermal component over-molded with the material can form a lateral portion that can be disposed between at least one busbar and at least one lateral wall of a housing of the distribution box. The lateral portion (e.g., the electrically isolating material and the thermal component) can be in thermal communication with the busbar. The thermal component can be electrically isolated from the busbar via the electrically isolating material over-molded around the thermal component. The material can prevent current from flowing through the thermal component. The thermal component (e.g., cold plate) over-molded with the electrically isolating material can improve the rate or efficiency of power distribution via the busbar, including, for example, by allowing the busbar to carry higher currents, have higher voltages or voltage duty cycles applied to the busbar, and deliver a higher amount of power in a rapid manner to various components of the vehicle.

At least one aspect is directed to a device. The device can include a busbar. The device can include a thermal component coupled to the busbar to dissipate heat generated at the busbar. The device can include a material molded over at least a portion of the thermal component to electrically isolate at least the portion of the thermal component from the busbar.

At least one aspect is directed to a method. The method can include providing a busbar. The method can include providing a thermal component coupled to the busbar to dissipate heat generated at the busbar. The method can include providing a material to mold over at least a portion of the thermal component. The material can electrically isolate at least the portion of the thermal component from the busbar.

At least one aspect is directed to a power distribution device. The power distribution device can include a busbar to convey power between a battery of a vehicle and a component of the vehicle to charge the battery of the vehicle or power a load of the vehicle via the battery of the vehicle. The power distribution device can include a thermal component to dissipate heat generated at the busbar. The power distribution device can include a material molded over at least a portion of the thermal component to electrically isolate at least the portion of the thermal component from the busbar.

At least one aspect is directed to a device. The device can include a busbar to convey power between a battery of a vehicle and a component of the vehicle. The device can include a housing. The housing can include a lateral wall. The lateral wall can include an inlet to receive a coolant. The lateral wall can include a thermal component to dissipate, via the coolant received through the inlet, heat generated at the busbar from conveyance of the power between the battery and the component of the vehicle. The lateral wall can include a material molded over the thermal component to electrically isolate the thermal component from the busbar.

At least one aspect is directed to a method. The method can include providing a thermal component. The thermal component can include an inlet to receive a coolant. The method can include molding a material around a surface of a first lateral side and a second lateral side of the thermal component to form a lateral portion. The method can include fixing the material molded over the first lateral side of the lateral portion to a lateral side of a housing. The method can include fixing a busbar to the material molded over the second lateral side of the lateral portion.

At least one aspect is directed to a battery pack. The battery pack can include a battery cell to charge via power provided by a power distribution box and power a load of a vehicle via the power distribution box. The battery pack can include the power distribution box. The power distribution box can include a housing. The housing can include a lateral wall. The power distribution box can include a busbar to convey power between a battery of the vehicle and a component of the vehicle. The power distribution box can include a lateral portion disposed between the busbar and the lateral wall of the housing. The lateral portion can include an inlet to receive a coolant. The lateral portion can include a thermal component to dissipate, via the coolant received through the inlet, heat generated at the busbar from conveyance of the power between the battery and the component of the vehicle. The lateral portion can include a material molded over the thermal component to electrically isolate the thermal component from the busbar.

At least one aspect is directed to a method. The method can include providing a device. The device can include a housing including a lateral wall. The lateral wall can include a busbar to convey power between a battery of a vehicle and a component of the vehicle. The device can include a lateral portion disposed between the busbar and the lateral wall of the housing. The lateral portion can include an inlet to receive a coolant. The lateral portion can include a thermal component to dissipate, via the coolant received through the inlet, heat generated at the busbar from conveyance of the power between the battery and the component of the vehicle. The lateral portion can include a material molded over the thermal component to electrically isolate the thermal component from the busbar.

At least one aspect is directed to an electric vehicle. The electric vehicle can include a battery cell to charge via power provided by a power distribution box and power a load of the electric vehicle via the power distribution box. The electric vehicle can include the power distribution box. The power distribution box can include a housing comprising a lateral wall. The power distribution device can include a busbar to convey power between the battery cell of the electric vehicle and a component of the electric vehicle. The power distribution device can include a lateral portion disposed between the busbar and the lateral wall of the housing. The lateral portion can include an inlet to receive a coolant. The lateral portion can include a thermal component to dissipate, via the coolant received through the inlet, heat generated at the busbar from conveyance of the power between the battery cell and the component of the electric vehicle. The lateral portion can include a material molded over the thermal component to electrically isolate the thermal component from the busbar.

These and other aspects and implementations are discussed in detail below. The foregoing information and the following detailed description include illustrative examples of various aspects and implementations, and provide an overview or framework for understanding the nature and character of the claimed aspects and implementations. The drawings provide illustration and a further understanding of the various aspects and implementations, and are incorporated in and constitute a part of this specification. The foregoing information and the following detailed description and drawings include illustrative examples and should not be considered as limiting.

BRIEF DESCRIPTION OF THE DRAWINGS

The accompanying drawings are not intended to be drawn to scale. Like reference numbers and designations in the various drawings indicate like elements. For purposes of clarity, not every component may be labeled in every drawing. In the drawings.

DETAILED DESCRIPTION

Figure 1:
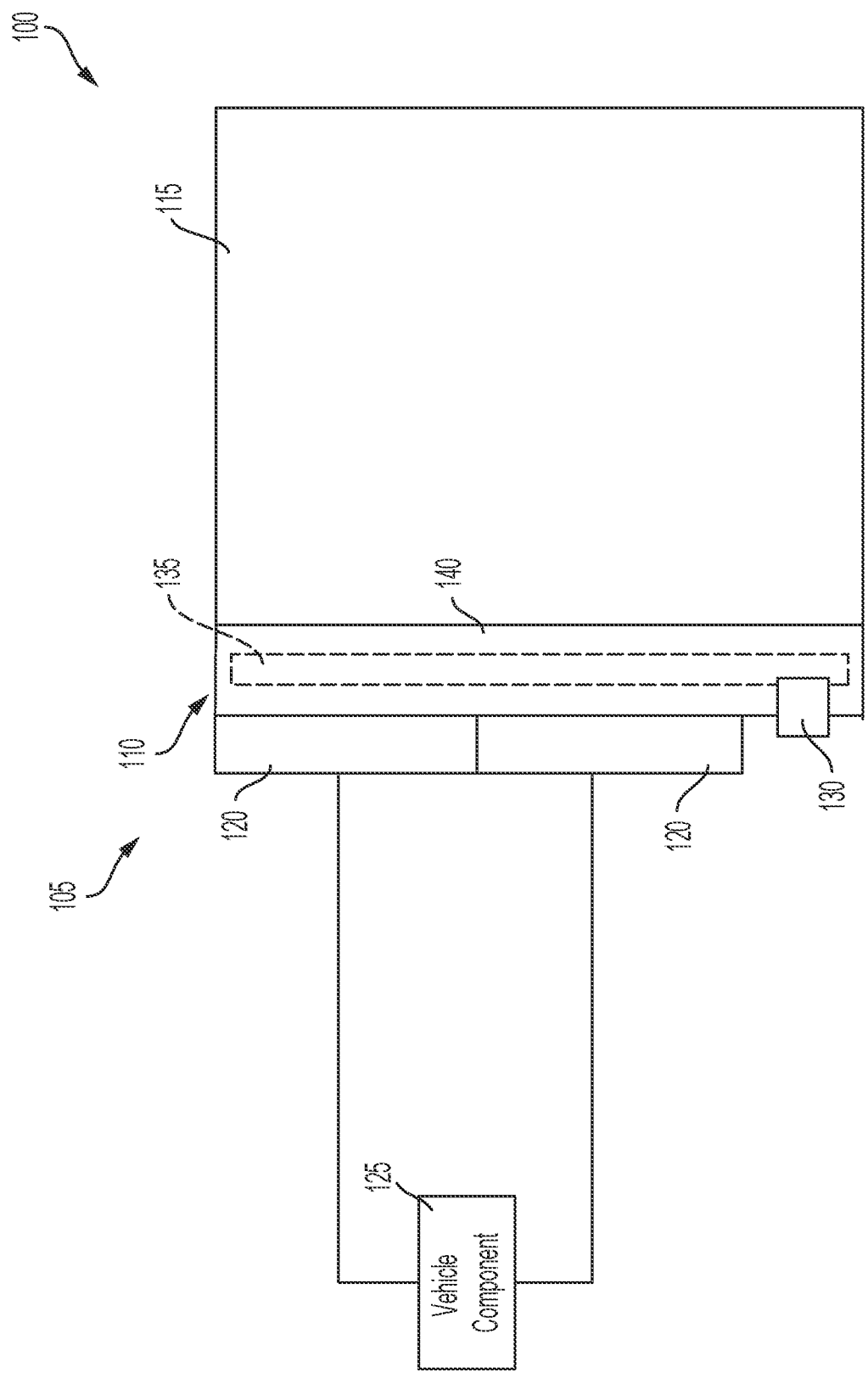
FIG. 1 depicts an example power distribution device including an over-molded thermal component.

Following below are more detailed descriptions of various concepts related to, and implementations of, methods, appa-ratuses, and systems of a power distribution device with a thermal component, such as a power distribution box in an electric vehicle. The various concepts introduced above and discussed in greater detail below may be implemented in any of numerous ways.

This disclosure is generally directed to a power distribution device of a vehicle. The power distribution device of this technical solution can include thermal component. For example, a power distribution box or high voltage power distribution box ("HVDB") of an electric vehicle can be configured with a thermal component that is integrated with the HVDB. A vehicle can include a battery pack that includes battery cells. The battery pack can include a distribution box that can control or monitor the battery cells. The distribution box can be an electrical gateway into or out of the battery pack. The distribution box can control charging of the battery cells, discharging of the battery cells, or distribution of battery power to loads of a vehicle. The distribution box can include contactors that switch power to or from the battery pack. For example, the distribution box can switch power from an external charging source to the battery pack to charge battery cells of the battery pack. The distribution box can switch power from the battery pack to loads of the vehicle, for example, motors, air conditioning systems, air compressors, heating systems, device charging systems, or other low voltage or high voltage loads of the electric vehicle.

The distribution box can include busbars. The busbars can electrically connect with the battery cells of the vehicle, the loads of the vehicle, or external power sources that the vehicle can charge from. A busbar can be a metal strip or bar. The metal strip or bar can be uninsulated to facilitate cooling. The busbar can be insulated in some cases. A busbar can allow for high current distribution without requiring joints. The busbars can increase in temperature due to current carried by the busbar that results from a voltage applied to the busbars (e.g., a continuous voltage or a duty cycle of voltage). A busbar can heat up to 125 degrees Celsius or more during operation. For example, the busbar temperature can increase during fast or rapid charging of battery cells of the battery pack. The temperature of the busbars can increase when powering large motors of a vehicle, e.g., drive motors for a truck, a sport utility vehicle (SUV), a semi-truck, a delivery truck, a service truck, or other vehicle. As the temperature of the busbar increases, the amount of current conveyed via the busbar or voltage applied to the busbar can be reduced in order to manage the temperature of the busbar. This reduction in current through the busbar can decrease power applied to the battery pack during charging, which can increase the amount of time taken to charge the battery pack. This reduction in current can also decrease power applied or to a vehicle drive train (or other component) during vehicle operation.

Increasing the size of the busbar can increase the thermal mass of the busbar and improve the ability of the busbar to cool. However, this increased size can cause additional resources to be used in the distribution box (e.g., copper or another conductive material of the busbar) and can increase the overall size and weight of the distribution box. Without temperature regulation, the busbar can be limited as to the voltage that can be applied to the busbars, the duty cycle of the voltage applied to the busbars, or the current that the busbars can carry when the distribution box is performing fast or rapid charging, driving large motors, or performing other high power sourcing or synching tasks, for example.

To solve these and other technical challenges, the distribution box described herein can include at least one thermal component, such as a plate or cold plate, over-molded with at least one material. The material can be an electrically isolating material such as a plastic. The electrically isolating material can be molded over a portion, or an entirety, of an outer surface of the thermal component (e.g., cold plate). The thermal component over-molded with the material can form a lateral portion that can be disposed between at least one busbar and at least one lateral wall of a housing of the distribution box. The lateral portion (e.g., the electrically isolating material and the thermal component) can be in thermal communication with the busbar. For example, a surface of the lateral portion formed by the isolating material can be in physical contact with the busbar or spaced a distance from the busbar. The thermal component disposed within the lateral portion can cool or otherwise regulate the temperature of the busbar by transporting heat, via a fluid or coolant, from the busbar to a radiator. The thermal component can be electrically isolated from the busbar via the electrically isolating material over-molded around the thermal component. The thermal component (e.g., cold plate) over-molded with the electrically isolating material can allow for the busbar to improve the efficiency or rate of power distribution via the busbar, including, for example, by carrying higher currents, having higher voltages or voltage duty cycles applied to the busbar, or delivering a higher amount of power in a rapid manner to various components of the vehicle.

The thermal component over-molded with the isolating material can allow for the busbars to be reduced in size, which can reduce the overall size or weight of the distribution box. Because the thermal component can facilitate controlling, managing, or otherwise regulating the temperature of the busbars, the thermal mass of the busbars can be reduced, thereby reducing the form factor for the busbars or the distribution box itself. A reduced weight of the power distribution box can allow for the energy stored by the battery of the electric vehicle to be used more efficiently, e.g., drive an electric vehicle further on a single charge. Further, because the busbars can be cooled by the thermal component, the distribution box can switch higher amounts of power, e.g., higher voltages, higher currents, high duty cycles in order to drive larger motors or charge batteries in a rapid manner. Because the thermal component can be over-molded with an electrically isolating material, the busbars can be directly fixed to the material without the thermal component and the busbars coming into electrical contact. Furthermore, the material can be fixed (e.g., directly) to at least one lateral wall of the housing of the distribution box. This can improve the construction and efficiency in building the distribution box.

FIG. 1 depicts an example system 100 including at least one power distribution device 105. The power distribution device 105 can be a system or apparatus. The power distribution device 105 can be a component of a vehicle. The power distribution device 105 is shown in an overhead view. The power distribution device 105 can be a device that conveys (e.g., transmits, carries, provides, or distributes) power between a battery cell and a load of a vehicle to power the load (e.g., a vehicle component 125) of a vehicle that sources, consumes, or receives the power. The battery cell can be included, or grouped with one or more other battery cells, in a battery module. One or multiple battery modules can form a battery pack. The battery cells can be organized within a battery pack or battery module according to a variety of different architectures. For example, the battery cells can be organized in a cell-to-pack architecture. For example, the battery cells can be organized in a top sub-module and a bottom-sub module that together, form a battery module. The power distribution device 105 can convey direct current (DC) power or alternating current (AC) power.

The vehicle component 125 can refer to or include at least one motor, at least one drivetrain, at least one air conditioning system, at least one air compressor, at least one heating system, at least one device charging system, at least one vehicle charging connector, or any other low voltage or high voltage components of the vehicle. The power distribution device 105 can convey (e.g., receive) power from a charging component to the battery cell, battery module, or battery pack to charge the battery cell, battery module, or battery pack. The charging can include DC fast charging or other charging techniques. For example, an electrical connector of the vehicle can convey power from an external charging system to the battery cell, battery module, or battery pack via the power distribution device 105. The external charging system can be a charging station of a garage, a parking lot, a rest stop, a gas station that provides power from an electrical grid. The external charging system can be a battery pack of another vehicle. Furthermore, a motor of a vehicle operating in a regenerative braking mode can convey power to the battery cell, battery module, or battery pack via the power distribution device 105. The power distribution device 105 can be an electrical gateway between a battery cell, battery module, or battery pack and internal components to the vehicle or external components to the vehicle.

The power distribution device 105 can include a battery management system (BMS) that monitors, manages, and controls a battery cell, battery module, or battery pack. The power distribution device 105 can be a HVDB. The power distribution device 105 can include at least one housing 115. The housing 115 can be a partial or complete enclosure that surrounds one or more electrical or mechanical components of the power distribution device 105. The electrical or mechanical components can include contactors, switches, fuses, a battery management system, data processing systems, sensors, processors, memory devices, filters. The housing 115 can include a first lateral side, a second lateral side, a third lateral side, a top side, and a bottom sides. The sides can be connected at their edges to form a partial or complete enclosure. The enclosure can be formed out of a plastic material, e.g., acrylonitrile butadiene styrene (ABS), polyamide (PA), polybutylene terephthalate (PBT)) or a metal material, e.g., aluminum, tin, steel.

The power distribution device 105 can include at least one busbar 120. The power distribution device 105 can include pairs of busbars 120. For example, a first busbar 120 can be a positive polarity busbar while a second busbar 120 can be a negative polarity busbar. The busbars 120 can electrically connect or couple with a vehicle component 125. The power distribution device 105 can include sets of busbars for various functions. For example, the power distribution device 105 can include a set of busbars 120 for charging, e.g., rapid or fast charging. The power distribution device 105 can include a set of busbars 120 for powering drives of the vehicle. The power distribution device 105 can include busbars 120 that are fully or partially vertically stacked. The power distribution device 105 can include busbars 120 that are laterally positioned, e.g., at least partially next to each other. The busbars 120 can electrically connect with a battery cell, battery module, or battery pack to provide power from a power source to the batter cell, battery module, or battery pack to charge the battery cell, battery module, or battery pack. The busbars 120 can electrically connect a battery cell, battery module, or battery pack of the vehicle with a load of the vehicle to provide power from the battery cell, battery module, or battery pack to the load of the vehicle to power the load of the vehicle.

The power distribution device 105 can include a portion 110, such as a lateral portion. The lateral portion 110 can be located between a lateral wall of the housing 115 and the busbars 120. The lateral portion 110 can be a carrier bracket for supporting the busbars 120. The lateral portion 110 can be integrated with, or form a lateral wall of the housing 115. The lateral portion 110 can be spaced from the housing 115. For example, the lateral portion 110 can be spaced one centimeter, two centimeters, less than one centimeter, or more than two centimeters from the housing 115. The lateral portion 110 can be physically touching the housing 115. The lateral portion 110 can be fixed to a lateral wall of the housing 115. The lateral portion 110 can be fixed via at least one bolt and nut, at least one screw, at least one snap, adhesive, or other connecting component to at least one lateral wall of the housing 115. The lateral portion 110 can be spaced from the busbars 120. For example, the lateral portion 110 can be spaced one centimeter, two centimeters, less than one centimeter, or more than two centimeters from the busbars 120. The lateral portion 110 can be physically touching the busbars 120. The busbars 120 can be fixed to the lateral portion 110. The busbars 120 can be fixed to the lateral portion 110 via at least one bolt and nut, at least one screw, at least one snap, adhesive, or other connecting device.

The lateral portion 110 can be in thermal communication with the busbars 120, e.g., coupled to the busbars 120 or interfacing with the busbars 120. The thermal communication can be conduction, convection, or a combination of the two. For example, heat generated at the busbars 120 can be transferred to the lateral portion 110 via conduction or convection. The busbars 120 can generate the heat when transferring current through the busbars 120 to convey power between a battery cell, battery module, battery pack and the vehicle component 125. The lateral portion 110 can dissipate heat at the busbars 120 generated from a variety of sources. For example, the lateral portion 110 can dissipate heat at the busbars 120 resulting from conveyance of power by the busbars 120, heat generated by batteries, a busbar temperature, external or ambient temperature, a thermal runaway event, etc. The lateral portion 110 can include a thermal component 135. The thermal component 135 can be disposed within the lateral portion 110. The thermal component 135 can be a plate, a cold plate, or another component that carries a coolant. The thermal component 135 can be a cast cold plate or a stamped and brazed cold plate. The thermal component 135 can be formed from a metal such as aluminum, copper, silver, or a combination thereof. The thermal component 135 can be formed from a thermally conductive plastic such as The coolant can be water, deionized water, a glycol and water solution, a dielectric fluid, or any other liquid that can absorb heat generated at the busbars 120 and transport the heat away from the busbars 120.

The dimensions of the thermal component 135 can be set such that the thermal component 135 can fit between the busbars 120 and the housing 115. The dimensions of the thermal component 135 can be set to dissipate heat of the busbars 120. The dimensions of the thermal component 135 can be set to extend across an entirety or a portion of the busbars 120 or the lateral wall of the housing 115. The dimensions of the thermal component 135 can be set based on the dimensions of the housing 115. The dimensions of the thermal component 135 can be set based on dimensions of the busbars 120. The thermal component 135 can be 3-7 millimeters thick. The thermal component 135 can be 4-6 millimeters thick. The thermal component 135 can be less than 3 millimeters thick. The thermal component 135 can be greater than 7 millimeters thick. The thermal component 135 can be 125-200 millimeters long. The thermal component 135 can be 150-175 millimeters long. The thermal component 135 can be less than 125 millimeters long. The thermal component 135 can be more than 200 millimeters long. The thermal component 135 can be 80-120 millimeters high. The thermal component 135 can be 90-110 millimeters high. The thermal component 135 can be less than 80 millimeters high. The thermal component 135 can be greater than 120 millimeters high. The shape or form of the thermal component 135 can be completely or partially flat, completely or partially curved, or have any other shape or any other form factor.

The thermal component 135 can be covered in a material 140. The material 140 can cover some or all of an outer surface of the thermal component 135. The thermal component can include a first lateral side, a second lateral side, a third lateral side, a fourth lateral side, a top side, and a bottom side. The material 140 can be molded over at least a portion of the first lateral side, the second lateral side, the third lateral side, the fourth lateral side, the top side, and the bottom side. The material 140 can be an electrically isolating material. For example, the material 140 can electrically isolate the busbars 120 from the thermal component 135 or the housing 115. The material 140 can be a plastic material, e.g., a non-conductive plastic material. The plastic material 140 can be acrylonitrile butadiene styrene (ABS), polyamide (PA), polybutylene terephthalate (PBT).

The material 140 can be molded over the thermal component 135 via an injection molding technique. For example, the thermal component 135 can be inserted into a mold. The mold can include a cavity that is shaped to conform to a shape of the lateral portion 110. The material 140 can be heated to melt and then injected, poured, shot, or added into the cavity in a liquid form. As the material 140 cools, the material 140 can harden around the thermal component 135 forming the lateral portion 110. The material 140 can be molded over an entire outer surface of the thermal component 135. For example, the thermal component 135 can be suspended within the cavity such that the material 140 covers the entire outer surface of the thermal component 135. The material 140 can cover an outer surface of the thermal component 135. The material 140 can cover a total or complete outer surface of the thermal component 135. The material 140 can cover a portion of the outer surface of the thermal component.

The thermal component 135 and the lateral portion 110 can be a prismatic shape, e.g., a rectangular solid. The thermal component 135 can include a first lateral side, a second lateral side, a third lateral side, a fourth lateral side, a top side, and a bottom side. The sides can form a rectangular solid. The thermal component 135 can be a cylindrical shape, a pyramid shape, a curved shape, a spherical shape, or any other shape or form factor. The material 140 can cover a portion or an entirety of outer surfaces of the first lateral side, the second lateral side, the third lateral side, the fourth lateral side, the top side, and the bottom side of the thermal component 135. The lateral portion 110 can include a shape that is the same as, but larger, than the thermal component 135. For example, the lateral portion 110 can have sides with dimensions that are proportional to the dimensions of the thermal component 135. The lateral portion 110 can be a different shape than the thermal component 135. The thermal component 135 can be located at a center of the lateral portion 110. The thermal component 135 can be offset from a central location of the lateral portion 110.

The thermal component 135 can be in thermal communication with the busbars 120. The thermal component 135 can couple or interface with the busbars 120 to cool the busbars 120 by dissipating heat generated at the busbars 120 or support the busbars 120. The thermal component can receive heat generated at the busbars 120 via conduction or convection. The thermal component can dissipate the heat generated at the busbars 120. A coolant that flows through the thermal component can receive the heat and transfer, spread, lose or otherwise dissipate the heat away from the busbars 120 and the thermal component 135. This can cool the busbars 120. The thermal component 135 can include a connector 130. The connector 130 can be a quick connect (QC) connector. The connector 130 can connect with a coolant manifold that carries coolant. The over-molded material 140 on the thermal component 135 can adhere to ports of the thermal component 135 and take the form of quick connect interfaces. This can reduce sealed interfaces and couple directly with the coolant manifold. The connector 130 can include an inlet for the coolant and an outlet for the coolant. The inlet can receive the coolant and through the material 140 and into the thermal component 135. The coolant can travel through a pathway or set of pipes through the thermal component 135. While the coolant travels through the thermal component 135, the coolant can receive the heat generated at the busbars 120. The coolant can be expelled from the thermal component 135 at the outlet. The inlet or the outlet can be quick connects or other connectors. The inlet can be connected to a coolant line of a vehicle. The coolant line can transport the coolant based on pressure in the line created by a pump. The coolant line can provide coolant from a pump or another thermal component to the thermal component 135. The outlet can be connected to another coolant line of the vehicle. The coolant can be provided via the outlet to another thermal component of the vehicle or a radiator that dissipates the heat of the coolant.

The material 140 molded over an outer side of the thermal component 135 can be fixed to the busbars 120. The busbars 120 can be fixed to the material 140 molded over the outer side of the thermal component 135. The material 140 molded over the outer side of the thermal component 135 can support the busbars 120. The material 140 molded over another outer side of the thermal component 135 can be fixed to a lateral wall of the housing 115. The lateral wall of the housing 115 can be fixed to the material 140 molded over the outer side of the thermal component 135. The material 140 molded over the outer side of the thermal component 135 fixed to the lateral wall of the housing 115 can support the lateral portion 110.

The thermal component 135 or the lateral portion 110 can be manufactured via a variety of manufacturing methods. For example, the lateral portion 110 can be at least a portion of a lateral wall of the housing 115 including at least one cast-in thermal component 135, such as a cast-in cooling channel. The cast-in cooling channels 135 can be or include a variety of channels, cavities, tunnels or other structures cast into a lateral wall of the housing 115. The channels 135 can carry coolant from an inlet of the connector 130 to an outlet of the connector 130 and dissipate heat generated at the busbars 120. The channels 135 can be formed by a material of the lateral wall of the housing 115 or another material disposed in the lateral wall of the housing 115. The materials can include at least one or a combination of aluminum, copper, silver, a thermally conductive plastic, or a combination thereof.

The thermal component 135 can be or include a thermal bladder. The thermal bladder 135 can be a flexible portion that holds coolant. The thermal bladder 135 can be a rigid portion that holds coolant. The thermal bladder 135 can be a thermally conductive plastic material, a rubber material, a metal material, or a combination thereof. The thermal bladder 135 can include a cavity or reservoir that holds coolant within the thermal bladder 135. The thermal bladder 135 can include at least one channel into or out of the cavity. Coolant can enter the thermal bladder 130 through an inlet of the connector 130 and can exit the thermal bladder 130 through an outlet of the connector 130. The thermal bladder 130 can dissipate heat generated at the busbars 120. The thermal bladder 130 can be a bag shape, a pouch shape, a pillow shape, a spheroid shape (e.g., an oblate or prolate), a prismatic shape, or any other shape. The thermal bladder 130 can be bonded, e.g., thermally bonded, to at least one of the lateral wall of the housing 115 and the busbars 120. The thermal bladder 130 can be bonded via a thermal paste, friction, one or more connectors, etc.

The lateral portion 110 can be an optional external component for the power distribution device 105. For example, the optional external component 110 can be added to, or removed from, an external side of the power distribution device 105 for some implementations of the power distribution device 105 or another power distribution box apparatus. The optional external component 110 can be added to the power distribution device 105 when the power distribution device 105 is used in a high power application. The optional external component 110 can include at least one foot or multiple feet, e.g., mounting feet. The mounting feet can be fixed (e.g., bolted, snapped, connected, glued, adhered) to the power distribution device 105, to a lateral wall of the housing 115 of the power distribution device 105, or a carrier bracket to fix the optional external component 110 to the power distribution device 105. The material of the lateral portion 110 molded over the thermal component 135 can be fixed to the mounting feet. The material of the lateral portion 110 can be molded to form the mounting feet. Examples of mounting feet or legs are described at FIG. 5.

Figure 2:
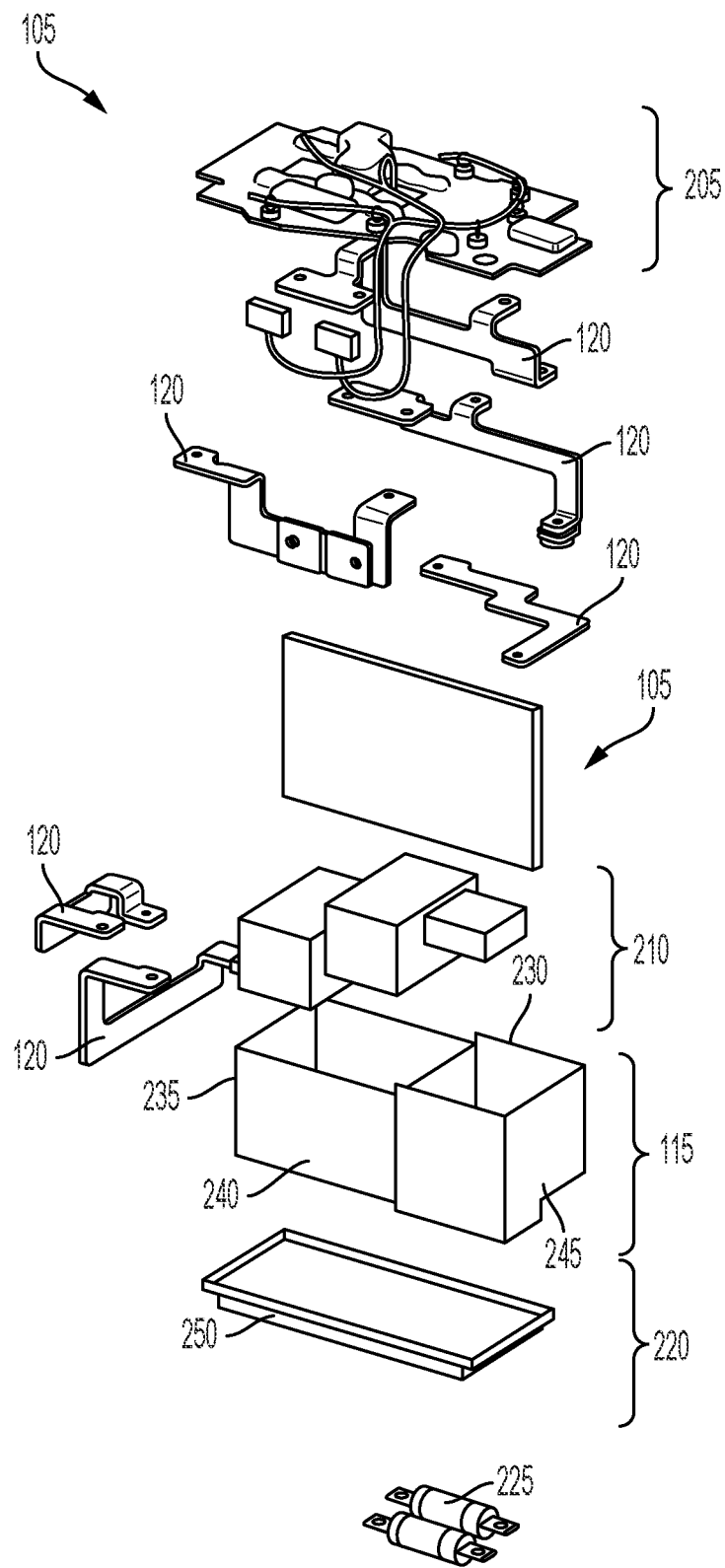
FIG. 2 depicts example components of a power distribution device.

FIG. 2 depicts example components of a power distribution device 105. FIG. 2 illustrates an expanded component view of the power distribution device 105. The power distribution device 105 can include a switch interface 205. The switch interface 205 can connect with at least one contactor 210. The switch interface 205 can provide electrical connections to a battery management system 220 or another system such that the battery management system 220 or the other system can electrically control the contactors 210 to open or close. The switch interface 205 can sensor or monitor the status of the contactors 210. The contactors 210 can be electrically controlled switches that switch electrical connections to or from the busbars 120 to provide power from a battery cell, battery module, or battery pack to a load of a vehicle or provide power from a charging source to the battery cell, battery module, or battery pack.

The housing 115 can include a cavity to hold the contactors 210. For example, the housing 115 can include internal walls that create cavities that hold components, such as the contactors 210, through friction. The busbars 120 can be fixed to the housing 115 on a first lateral wall 230 of the housing 115, a second lateral wall 235 of the housing 115, a third lateral wall 240 of the housing, or a fourth lateral wall 245 of the housing. The busbars 120 can be fixed to a top side of the housing 115 or a bottom side of the housing 115.

At least one thermal component 135 can be fixed to the first lateral wall 230, the second lateral wall 235, the third lateral wall 240, the fourth lateral wall 245, a top side of the housing 115, or a bottom side of the housing 115. An inner side of the thermal component 135 can be fixed to the first lateral wall 230, the second lateral wall 235, the third lateral wall 240, the fourth lateral wall 245, a top side of the housing 115, or a bottom side of the housing 115. The busbars 120 can be fixed to an outer side of at least one thermal component 135.

The power distribution device 105 can include at least one battery management system 220. The battery management system 220 can include a data processing system. An exemplary data processing system is described at FIG. 14. The battery management system 220 can control the contactors 210 by making electrical connections with the contactors 210 through the switch interface 205. The battery management system 220 can control the contactors 210 to switch power to or from a battery cell, a battery module, a battery pack, a load of a vehicle, or a charging system. The battery management system 220 can receive commands from a control system of a vehicle and operate the contactors 210 based on the commands. For example, the battery management system 220 can receive a command to supply power to a drive of the vehicle, a command to activate a heater of the vehicle, a command to operate an air conditioning compressor of the vehicle. The battery management system 220 can record characteristic data of the battery cell, battery module, battery pack. The characteristic data can include data that describes a temperature, voltage, state of charge, or other measurement of a battery cell, battery module, or battery pack. At least one printed circuit board (PCB) for the battery management system 220 can be included within a lid or cover 250 of the housing 115. The lid or cover 250 can be fixed to the housing 115 via one or more screws, bolts, snaps, straps, or other connecting apparatus. The power distribution device 105 can include at least one fuse 225. The fuse 225 can be a normally open fuse. The fuse 225 can close responsive to detecting a current level that satisfies a threshold, e.g., the current level is greater than or equal to the threshold.

Figure 3:
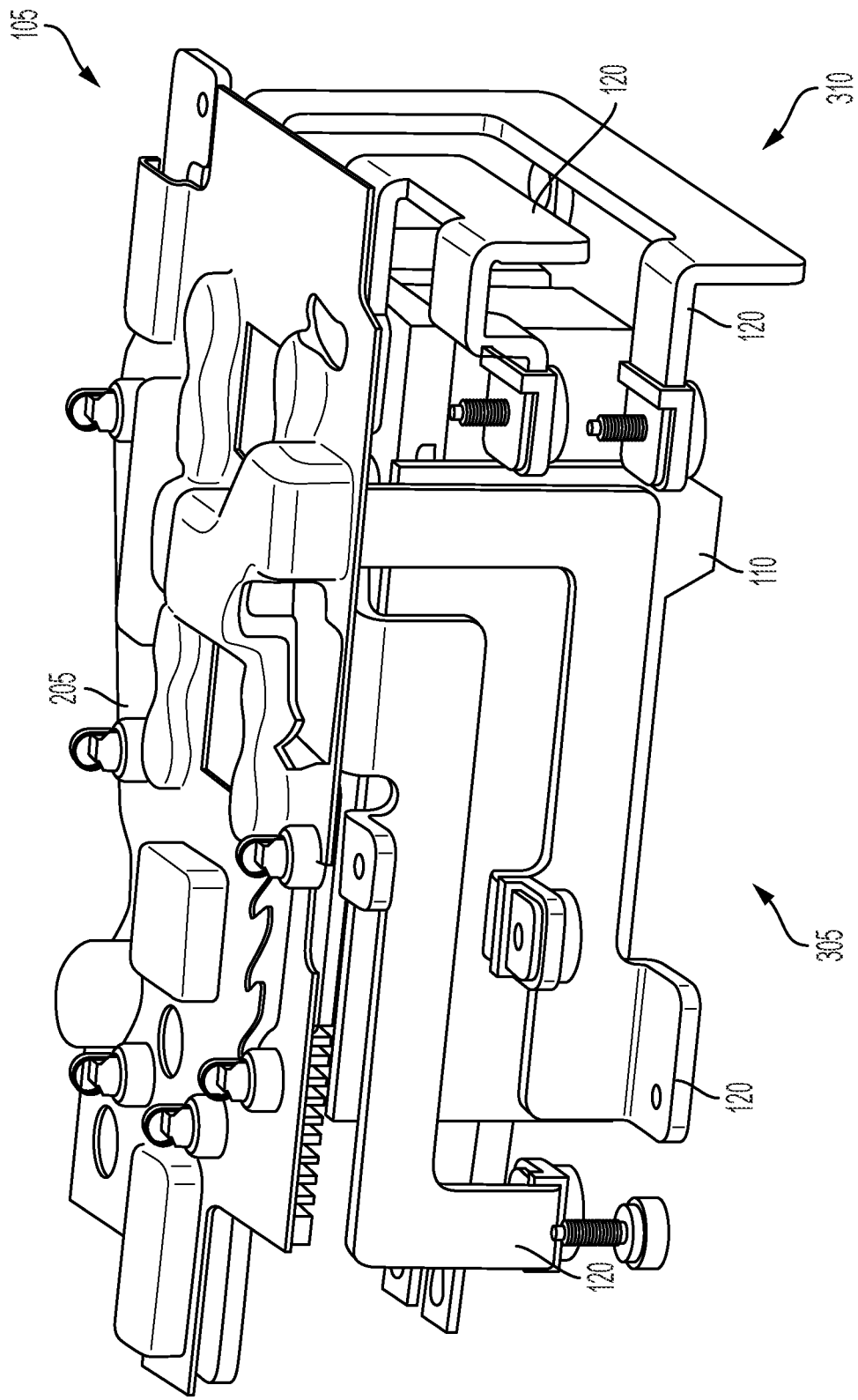
FIG. 3 depicts an example power distribution device including an over-molded thermal component fixed to a housing of the example power distribution device.

FIG. 3 depicts an example power distribution device 105 including a lateral portion 110 including a thermal component 135 over-molded with a material 140. The lateral portion 110 can be located on a first side 305 of the power distribution device 105 between a lateral wall of the housing 115 and first busbars 120. The lateral portion 110 can transport heat generated by the busbars 120 on the first side 305 of the power distribution device 105 away from the power distribution device 105 via a coolant that runs through the thermal component 135 of the lateral portion 110.

Although the power distribution device 105 is shown to include one lateral portion 110, a second lateral portion 110 can be located on a second side 310 of the power distribution device 105 between a second lateral wall of the housing 115 and second busbars 120. Similarly, a lateral portion 110 can be located on a third, fourth, top, or bottom side of the power distribution device 105. The lateral portion 110 can transport heat generated by the busbars 120 on the second side 310 of the power distribution device 105 away from the power distribution device 105 via a coolant that runs through the thermal component 135 of the lateral portion 110.

Figure 4:
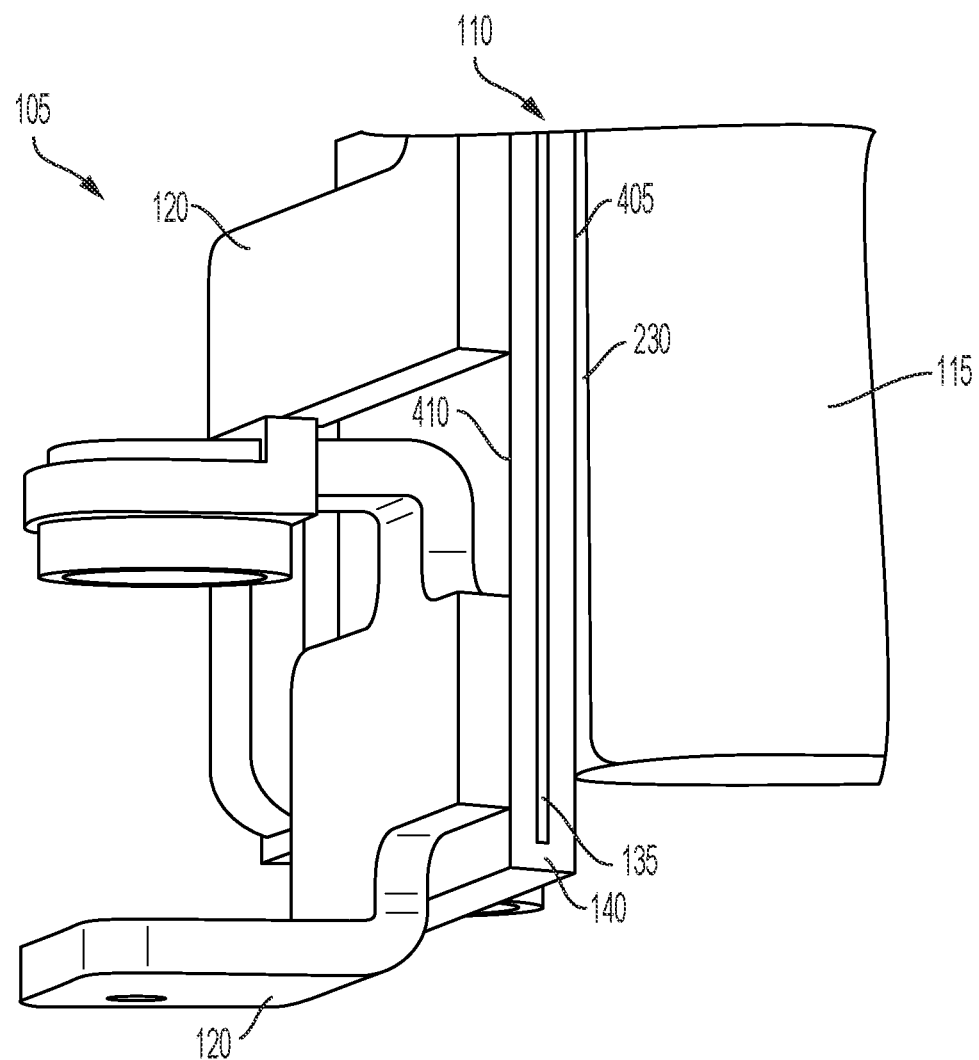
FIG. 4 depicts an example power distribution device including busbars fixed to an over-molded thermal component which is fixed to a housing of the power distribution device.

FIG. 4 depicts an example power distribution device 105 including busbars fixed to an over-molded thermal component which is fixed to a housing of the power distribution box. A first side 405 of the material 140 of the lateral portion 110 can be fixed to the first lateral wall 230. The first side 405 of the material 140 of the lateral portion 110 can be fixed to an outer surface of the first lateral wall 230 via at least one adhesive, at least one screw, at least one bolt, at least one fastener, at least one connector, or any other connecting assembly. The first lateral wall 230 of the housing 115 can support the lateral portion 110. For example, the first lateral wall 230 of the housing 115 can suspend the lateral portion 110 by the first side 405 of the material 140 of the lateral portion 110 being fixed to the first lateral wall 230 of the housing 115.

The busbars 120 can be fixed to a second lateral side 410 of the material 140 of the lateral portion 110. The busbars 120 can be fixed to an outer surface of the second lateral side 410 of the material 140 of the lateral portion 110 via at least one adhesive, at least one screw, at least one bolt and nut, at least one fastener, at least one connector, or any other connecting assembly. The second lateral side 410 of the material 140 of the lateral portion 110 can support the busbars 120. For example, second lateral side 410 of the material 140 of the lateral portion 110 can suspend the busbars 120.

Figure 5:
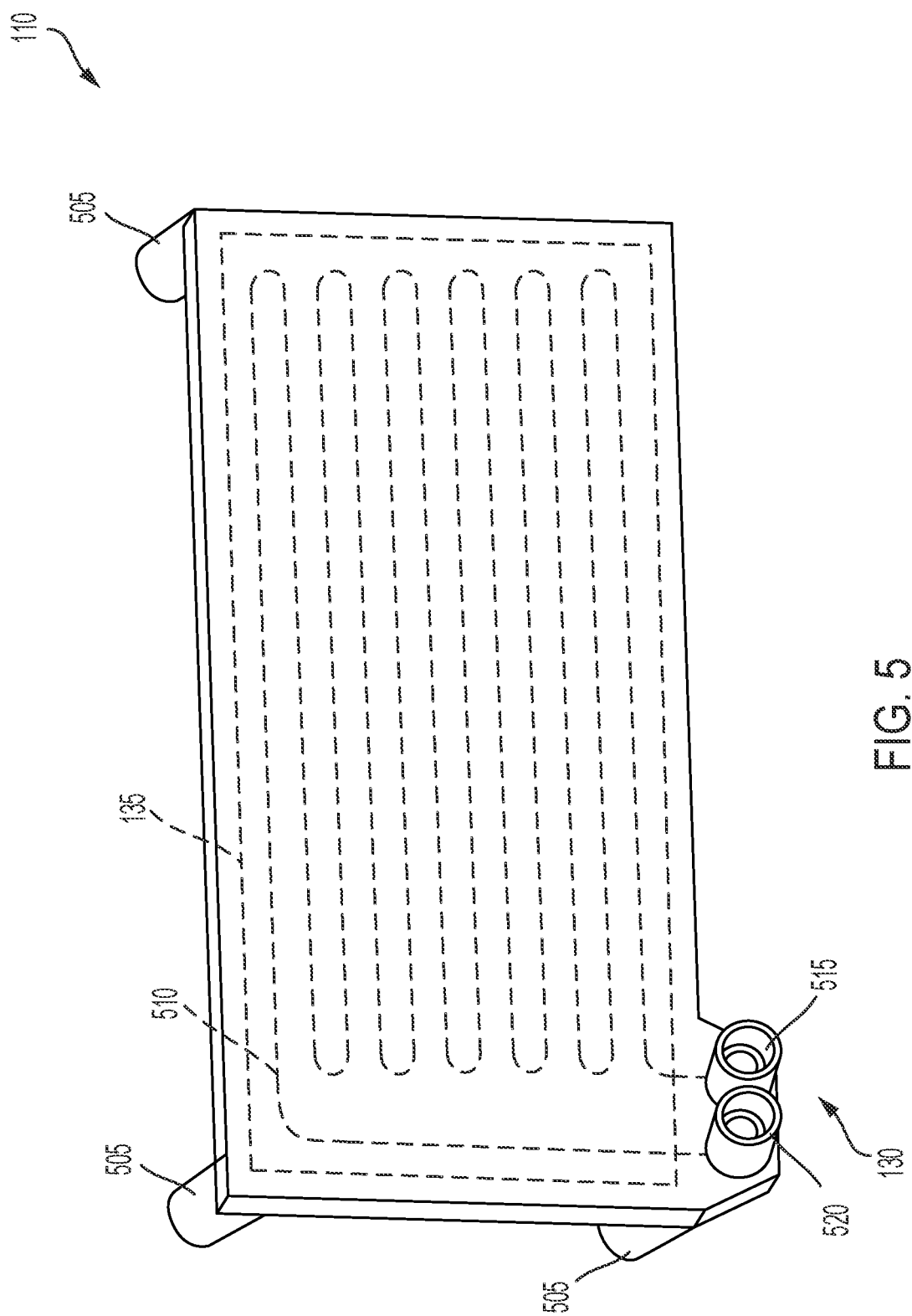
FIG. 5 depicts an example lateral portion of a power distribution device including a thermal component over-molded with a material and including legs.

FIG. 5 depicts an example lateral portion 110 of a power distribution device 105 including a thermal component 135 over-molded with a material 140 and at least one foot or leg 505. The thermal component can include one or multiple feet or legs. The leg 505 can be formed by the material 140. For example, when the lateral portion 110 is molded, at least one leg 505 can be molded to form a continuous portion. In some cases, the leg 505 is separate from the material 140 and is fixed to an outer surface of the material 140. The leg 505 can be a plastic material, e.g., acrylonitrile butadiene styrene (ABS), polyamide (PA), polybutylene terephthalate (PBT)) or a metal material, e.g., aluminum, tin, steel. The leg 505 can be mounted to an outer surface of the material 140 molded over the thermal component 135. The leg 505 can be configured to connect to an outer surface of a lateral wall of the housing 115. The leg 505 can be inserted into an opening in the material 140 and fixed to an inner portion of the material 140. The legs 505 can be fixed to an outer surface of the lateral portion 110 opposite a side that includes openings of the connector 130. The legs can be fixed to an outer surface of the lateral portion 110 on the same side that includes the openings of the connector 130.

The legs 505 can be fixed to the housing 115. The legs 505 can fix to receivers of the housing 115. For example, the legs 505 can be cylindrical and fit with a receiving member that is cylindrical with a diameter greater than a diameter of the legs 505. For example, the legs 505 and the receiving member can form a telescoping assembly. The legs 505 can be pressed against a flat surface of the housing 115. The housing 115 can include one or more holes for bolts, screws, or other connectors to fit through and fasten to. A bolt, screw, or connector of the legs 505 can fit through the holes of the housing 115 and the legs 505 can be fixed to the outer surface of the housing 115 via the bolts, screws, or connectors and friction between an end of the legs 505 and the outer flat surface of the housing 115.

The connector 130 can include an inlet 515 and an outlet 520. The inlet 515 can receive a coolant into the thermal component 135. The outlet 520 can expel the coolant from the thermal component 135. The roles of the inlet 515 and the outlet 520 can be switched. The inlet 515 can be connected to a line of a vehicle that carries coolant to the inlet 515. The outlet 520 can be connected to a line of a vehicle that carries coolant to a radiator or another component of a cooling system. The thermal component 135 can include a channel 510, such as a tunnel or tubing, that carries the coolant through the thermal component 135 in a pattern. The channel 510 can be a mini-channel. The pattern can be a zigzag pattern, a winding pattern, a horizontal winding pattern, a vertical winding pattern, or any other pattern or combination of patterns. The channel 510 can carry the coolant from the inlet 515, through the thermal component 135, to the outlet 520 of the thermal component 135.

Figure 6:
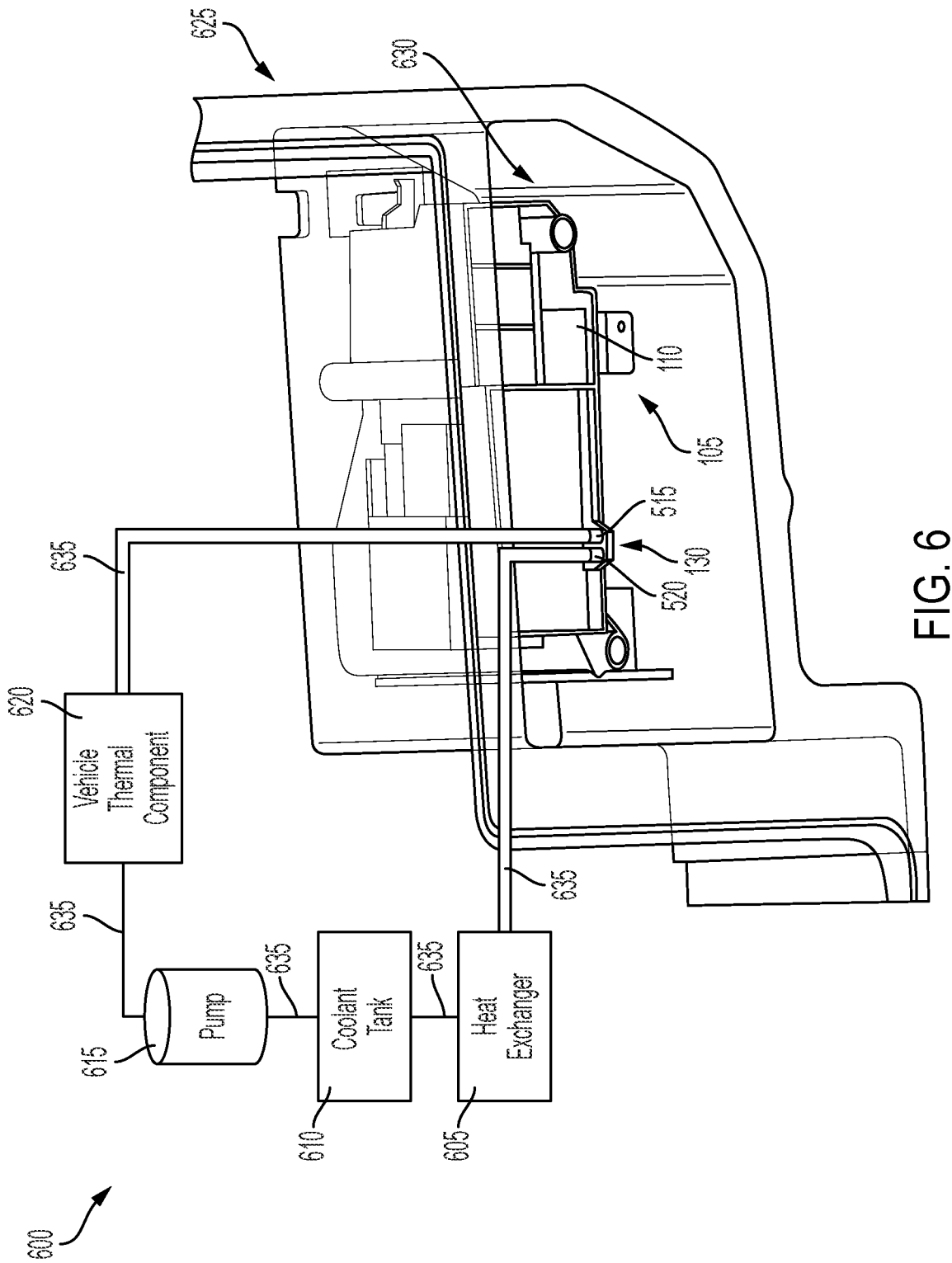
FIG. 6 depicts an example cooling system that provides coolant to a power distribution device.

FIG. 6 depicts an example cooling system 600 including a power distribution device 105. The cooling system 600 can deliver coolant to a battery pack 625. The cooling system 600 can receive the coolant from the battery pack 625. The battery pack 625 can include battery cells or battery modules. The battery pack 625 can include the power distribution device 105. The battery pack 625 can include a cavity 630. The cavity 630 can include inner surfaces, e.g., a bottom side, a top side, a left side, a right side, and a back side. A cover can fit over an opening formed by edges of the bottom side, the top side, the left side and the right side. The cavity 630 can include the power distribution device 105. The power distribution device 105 can be fixed within the cavity 630. For example, the power distribution device 105 can be fixed to the bottom side, the top side, the left side, the right side, the back side, or the cover. The power distribution device 105 can be fixed with at least one screw, bolt, snap, or connector.

The cooling system 600 can be a cooling system dedicated for cooling the power distribution device 105. The cooling system 600 can be a cooling system dedicated for cooling components of the battery pack 625, e.g., battery cells, battery modules, the power distribution device 105. The cooling system 600 can be a cooling system dedicated for cooling components of a vehicle, e.g., drives, battery packs, brakes, or other heat generating components of the vehicle.

The cooling system 600 can include at least one heat exchanger 605. The heat exchanger 605 can dissipate heat from the coolant to an outside surrounding. The heat exchanger 605 can be a radiator. The heat exchanger 605 can carry the coolant through at least one channel, e.g., tubes or tunnels in a material. The channels can wind, zig-zag, or form another shape. An airflow can be provided over the heat exchanger 605 to transfer heat from the coolant into the airflow via convection. The airflow can be created through one or more fans configured to blow air over the heat exchanger 605. The airflow can be created through a motion of a vehicle. Coolant can be dispelled from the lateral portion 110 via the outlet 520 into at least one line 635 of the cooling system 600. The line 635 can be a plastic or metal tube that transports coolant between the outlet 520 and the heat exchanger 605.

Another line 635 can transport the coolant from the heat exchanger 605 into at least one coolant tank 610 that stores a reservoir of coolant. The coolant tank 610 can be an accumulator that stores excess coolant. The coolant tank 610 can store the coolant until the coolant is pumped back to the power distribution device 105. At least one pump 615 can pump the coolant from the coolant tank 610, via a line 635, into a vehicle thermal component 620 or into the lateral portion 110. The pump 615 can be a centrifugal pump, a vertical centrifugal pump, a horizontal centrifugal pump, a diaphragm pump. The vehicle thermal component 620 can be a thermal component of a battery cell or battery module of the battery pack 625. The coolant can first receive heat generated at the vehicle thermal component 620 before being transported via a line 635 to the power distribution device 105 to cool the busbars 120. The cooling system 600 can transport the coolant to the power distribution device 105 before the coolant is transported to the vehicle thermal component 620.

The vehicle thermal component 620 can heat coolant that flows through the cooling system 600. The inlet 515 of the lateral portion 110 can receive the heated coolant from the vehicle thermal component 620 via a line 635. The vehicle thermal component 620 can heat the coolant via the before the coolant is received by the lateral portion 110. The thermal component 135 can further heat the coolant with heat generated at the busbars 120.

Figure 7:
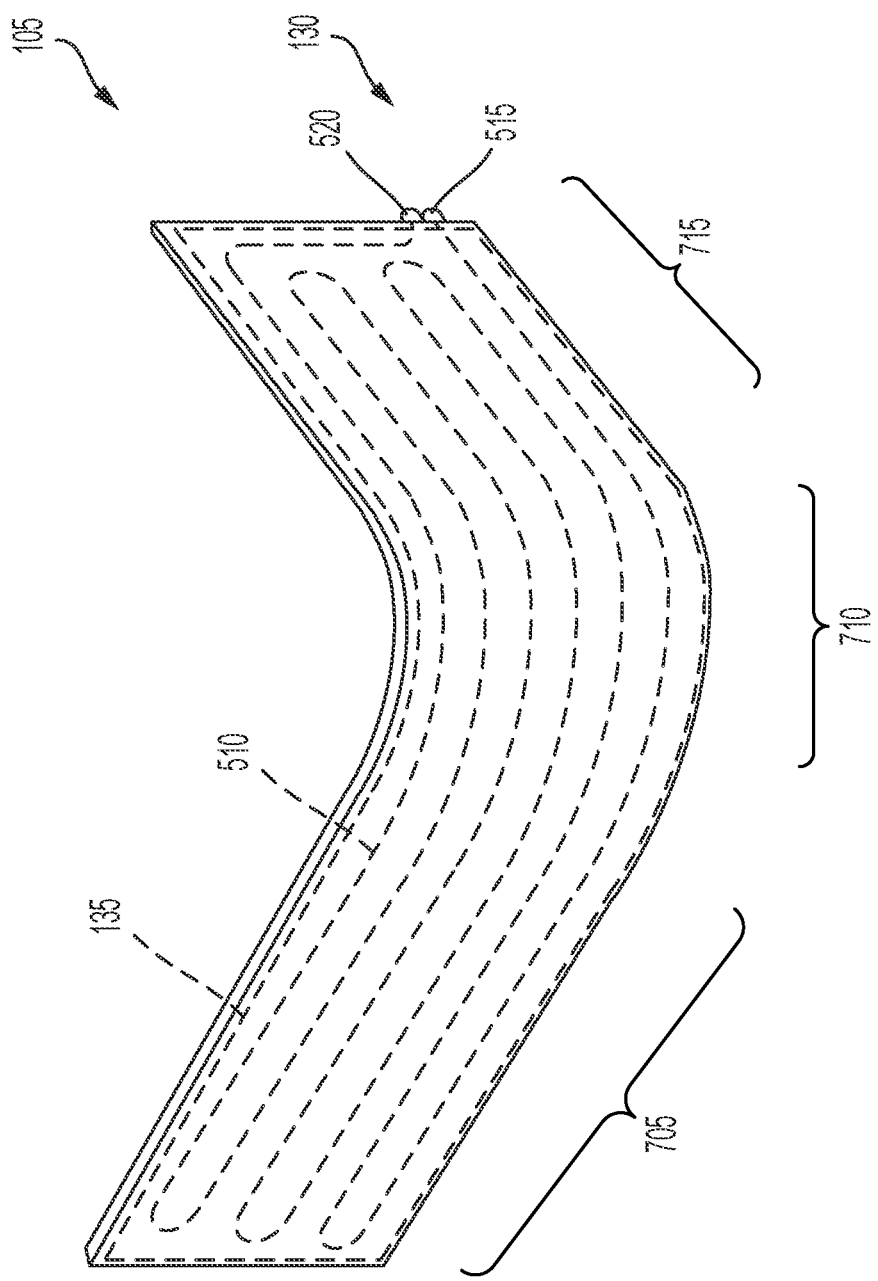
FIG. 7 depicts an example curved lateral portion including a curved thermal component over-molded with a material.

FIG. 7 depicts a curved lateral portion 110 including a curved thermal component 135 over-molded with a material 140. The lateral portion 110 can include a portion 705, a portion 710, and a portion 715. The thermal component 135 can include a portion 705, a portion 710, and a portion 715. The portion 705 and the portion 715 of the lateral component 110 and the thermal component 135 can be flat or substantially flat. The portion 710 of the lateral component 110 and the thermal component 135 can be curved or substantially curved. The thermal component 135 can be a continuous component that extends from the portion 705, through the curved portion 710, and through the portion 715. The curved portion 710 can transport coolant between the portion 705 of the thermal component 135, the portion 710 of the thermal component 135, and the portion 715 of the thermal component 135.

The thermal component 135 can include multiple separate components. For example, the thermal component 135 can include a first thermal component located in the first portion 705 of the lateral portion 110, the thermal component 135 can include a curved thermal component located in the curved portion of the lateral portion 110, and the thermal component 135 can include a third thermal component located in the portion 715 of the thermal component 135. The components of the thermal component 135 can be connected via one or more tubes that carry coolant between the various component of the thermal component 135.

Figure 8:
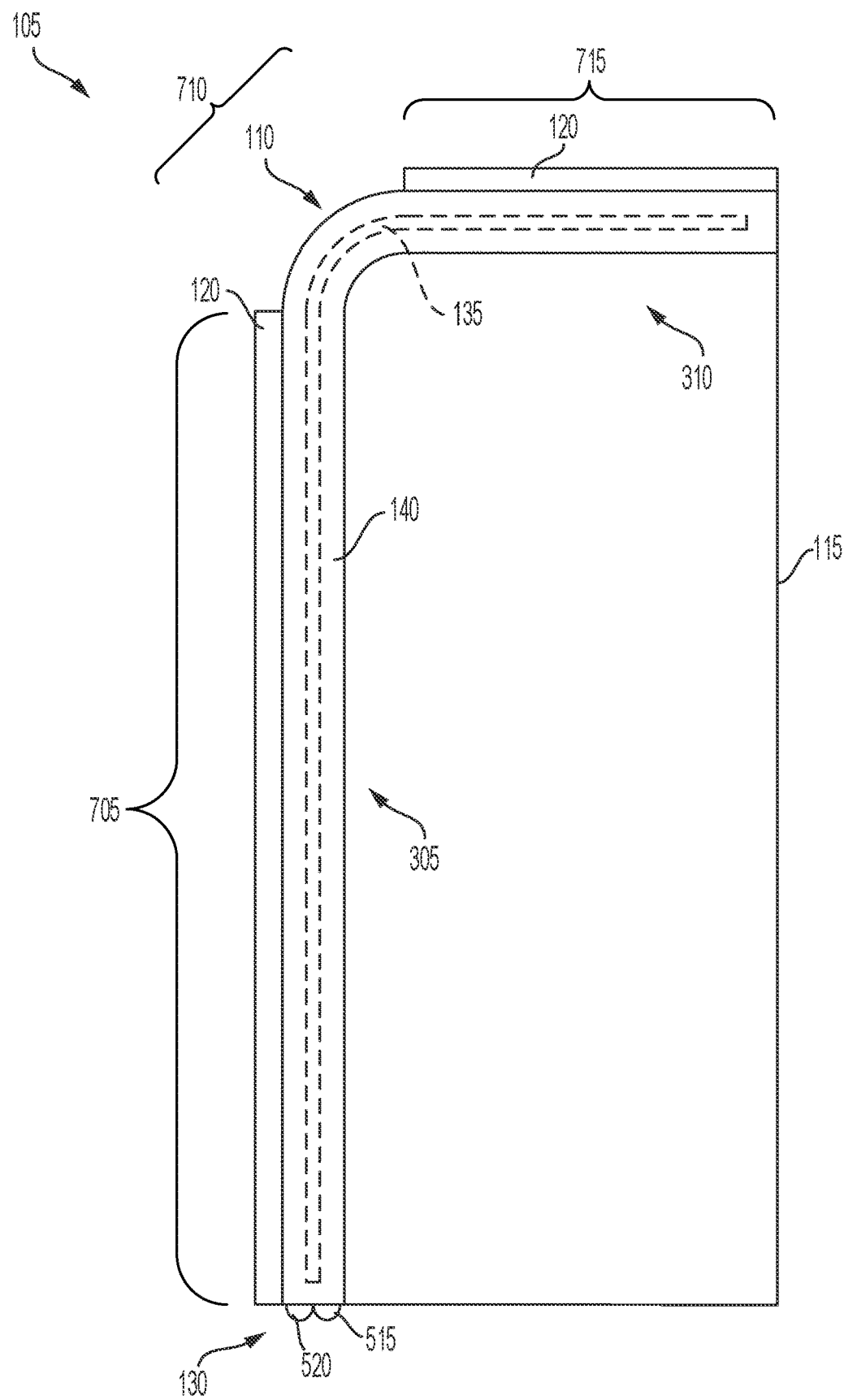
FIG. 8 depicts an example lateral portion including a curved thermal component over-molded with a material and fixed to a housing.

FIG. 8 depicts a lateral portion 110 including a curved thermal component 135 over-molded with a material 140 and fixed to the housing 115. A first portion 705 of the lateral portion 110 including a first portion 705 of the thermal component 135 can be disposed between a lateral wall of the housing 115 on a first side 305 of the housing 115 and at least one first busbar 120. A second portion 715 of the lateral portion 110 including a second portion 715 of the thermal component 135 can be disposed between a lateral wall of the housing 115 on a second side 310 of the housing 115 and at least one second busbar 120. The first portion 705 of the thermal component 135 can transport heat generated at the first busbar 120 away from the first busbar 120. The second portion 715 of the thermal component 135 can transport heat generated at the second busbar 120 away from the second busbar 120.

The coolant can be received by the second portion 715 of the thermal component 135 via the inlet 515. The coolant can travel through the first portion 705 of the thermal component 135 to dissipate heat generated at the first busbar 120. The coolant can travel through the curved portion 710 into the second portion 715 of the thermal component 135. The coolant can dissipate heat generated at the second busbar 120. The coolant can return from the second portion 715 of the thermal component 135 through the curved portion 710 of the thermal component 135 back through the first portion 705 of the thermal component 135 to the outlet 520. The coolant can travel through the first portion 705 of the thermal component 135, the curved portion 710 of the thermal component 135, and the first portion 705 of thermal component 135 one or multiple times before being discharged from the thermal component 135 at the outlet 520.

Figure 9:
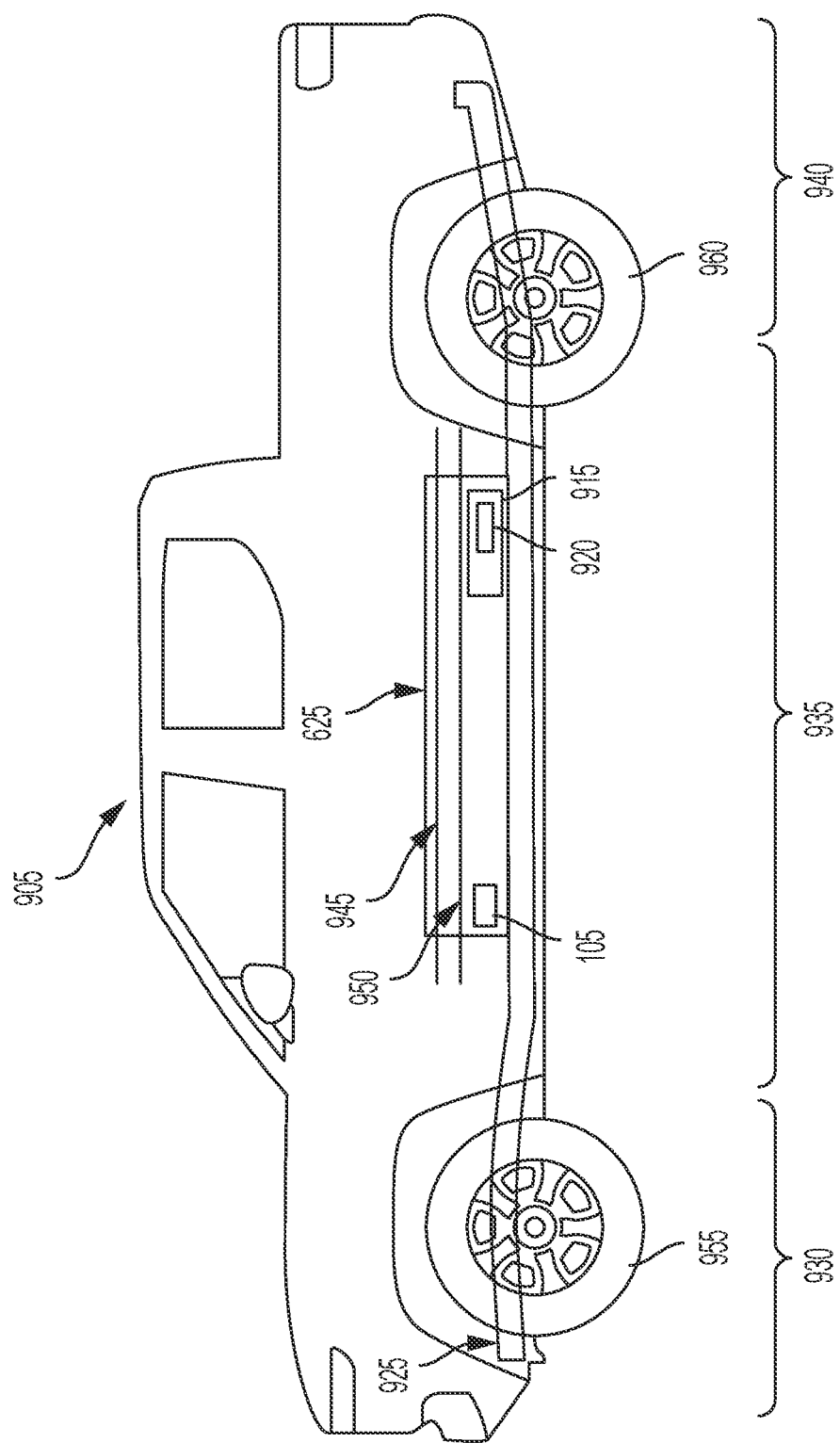
FIG. 9 depicts an example vehicle.

FIG. 9 depicts an example vehicle 905 including at least one power distribution device 105. The vehicle 905 can be installed with at least one battery pack 625 that includes the power distribution device 105. The power distribution device 105 can switch power between the battery pack 625 and loads of the vehicle. The power distribution device 105 can switch power to the battery pack 625 from a charging source to charge the battery pack 625. The vehicle 905 can be an electric vehicle. Electric vehicles 905 can include electric trucks, electric sport utility vehicles (SUVs), electric delivery vans, electric automobiles, electric cars, electric motorcycles, electric scooters, electric passenger vehicles, electric passenger or commercial trucks, hybrid vehicles, or other vehicles such as sea or air transport vehicles, planes, helicopters, submarines, boats, or drones, among other possibilities. The battery pack 625 can be used as an energy storage system to power a building, such as a residential home or commercial building. Electric vehicles 905 can be fully electric or partially electric (e.g., plug-in hybrid). The vehicle 905 can be a gas, diesel, or hydrogen powered vehicle. The electric vehicles 905 can be fully autonomous, partially autonomous, or unmanned. Electric vehicles 905 can be human operated or non-autonomous. Electric vehicles 905 such as electric trucks or automobiles can include on-board battery packs 625, battery modules 915, or battery cells 920 to power the electric vehicles.

The vehicle 905 can include a chassis 925 (e.g., a frame, internal frame, or support structure). The chassis 925 can support various components of the vehicle 905. The chassis 925 can span a front portion 930 (e.g., a hood or bonnet portion), a body portion 935, and a rear portion 940 (e.g., a trunk, payload, or boot portion) of the electric vehicle 905. The battery pack 625 can be installed or placed within the vehicle 905. For example, the battery pack 625 can be installed on the chassis 925 of the vehicle 905 within one or more of the front portion 930, the body portion 935, or the rear portion 940. The battery pack 625 can include or connect with at least one busbar, e.g., a current collector element. For example, the first busbar 945 and the second busbar 950 can include electrically conductive material to connect or otherwise electrically couple the battery modules 915 or the battery cells 920 with other electrical components of the vehicle 905 to provide electrical power to various systems or components of the vehicle 905.

The vehicle 905 can include at least one front wheel 955 and at least one rear wheel 960. The vehicle 905 can include one or multiple motors. The motors can drive an axel connected to two front wheels 955 or an axel connected to two rear wheels 960. A single motor can drive an axel of the two front wheels 955. A single motor can drive an axel of the two rear wheels 960. Each wheel of the wheels 955 and 960 can be driven by an individual motor. For example, each of the four wheels 955 and 960 can be driven by one of four motors. The battery pack 625 can discharge stored energy to provide power, via the power distribution device 105, to the motors of the front wheels 955 and the rear wheels 960. The battery pack 625 can discharge stored energy to generate power that the motors receive via the power distribution device 105. Operating the motors of the wheels 955 and 960 can cause the vehicle 905 to drive forward, reverse, or turn. A tractive component, e.g., the motor, can transports the electric vehicle 905 based on power received from the battery cells 920.

Figure 10:
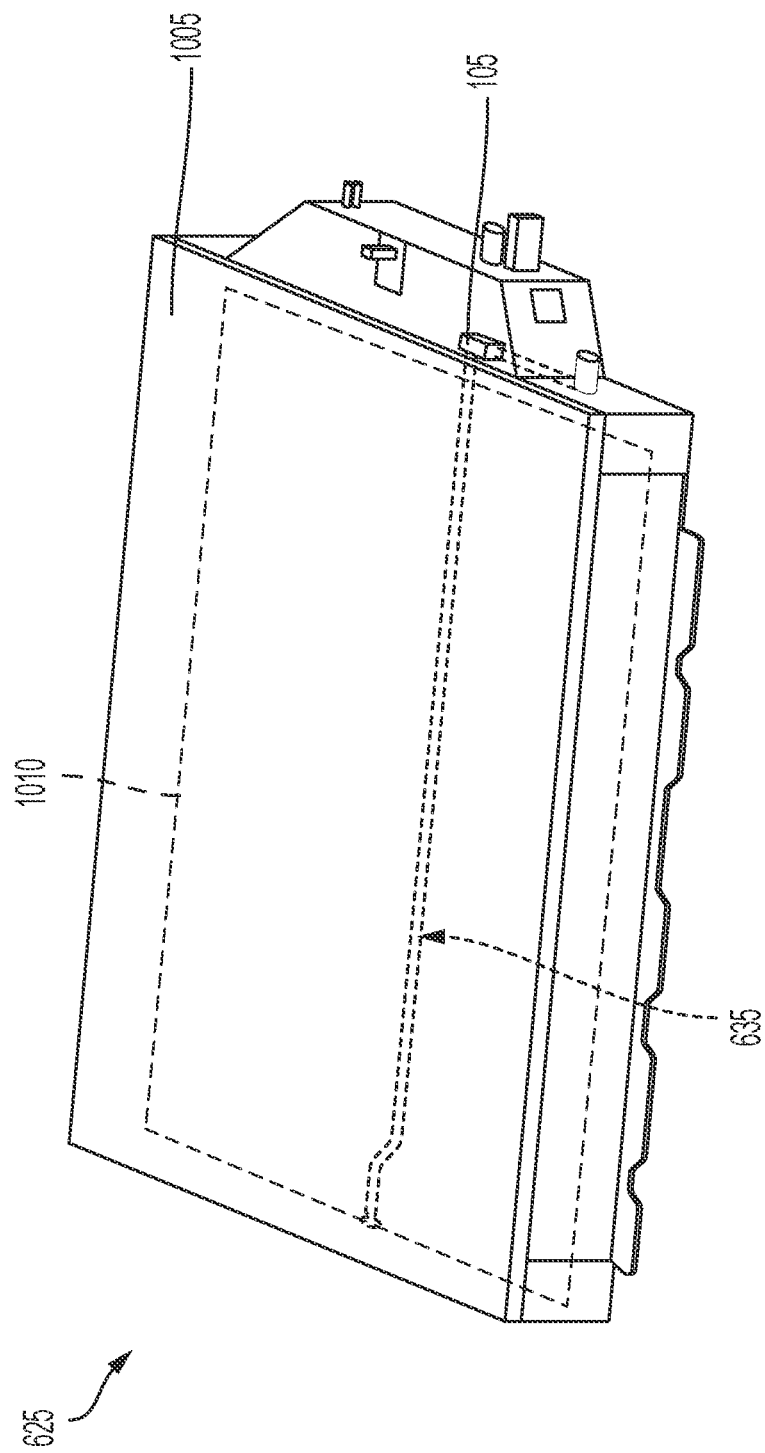
FIG. 10 depicts an example battery pack of a vehicle.

FIG. 10 depicts an example battery pack 625 of a vehicle. The battery pack 625 can provide power to electric vehicle 905. The battery pack 625 can include at least one power distribution device 105 that can provide power from the battery pack 625 to loads of the electric vehicle 905. The power distribution device 105 can receive power from a charging source and charge the battery pack 625. Battery packs 625 can include any arrangement or network of electrical, electronic, mechanical or electromechanical devices to power a vehicle of any type, such as the electric vehicle 905. The battery pack 625 can include at least one housing 1005. The housing 1005 can include at least one battery module 915 or at least one battery cell 920, as well as other battery pack components. The housing 1005 can include a shield on the bottom or underneath the battery module 915 to protect the battery module 915 from external conditions, for example if the electric vehicle 905 is driven over rough terrains (e.g., off-road, trenches, rocks, etc.).

The battery pack 625 can include at least one cooling line 635 that can distribute fluid through the battery pack 625 as part of a thermal/temperature control or heat exchange system that can also include at least one thermal component 1010 (e.g., a cold plate). The thermal component 1010 can be positioned in relation to a top submodule and a bottom submodule, such as in between the top and bottom submodules, among other possibilities. The battery pack 625 can include any number of thermal components 1010. For example, there can be one or more thermal components 1010 per battery pack 625, or per battery module 915. At least one cooling line 635 can be coupled with, part of, or independent from the thermal component 1010. The cooling line 635 can deliver coolant to the power distribution device 105. For example, the coolant can be provided to the thermal component 135 of the lateral portion 110 of the power distribution device 105 to dissipate power generated at busbars 120 of the power distribution device 105. The coolant can be provided to the power distribution device 105 and then to the thermal component 1010. The coolant can be provided to the thermal component 1010 and then to the power distribution device 105.

Figure 11:
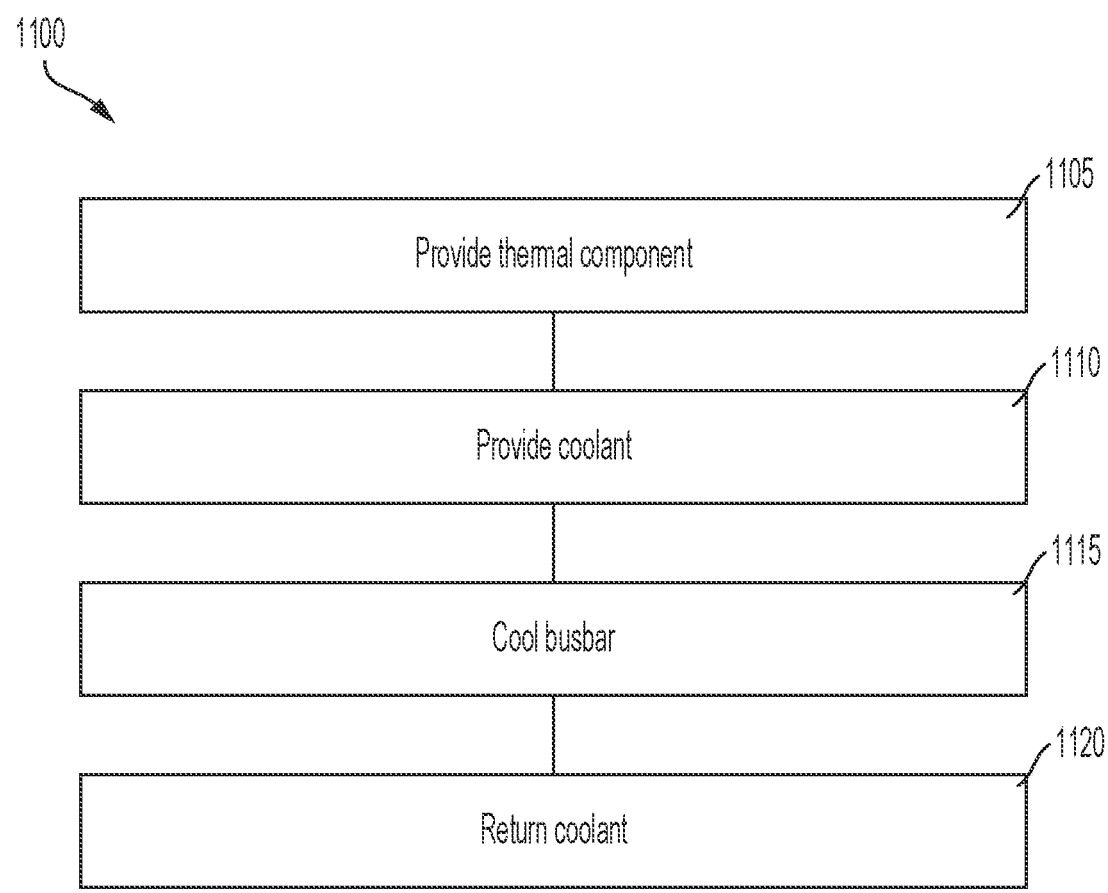
FIG. 11 depicts an example method for a power distribution device including a thermal component over-molded with a material.

FIG. 11 depicts an example method 1100 for a power distribution device 105 including a thermal component 135 over-molded with a material 140. At least one ACT of the method 1100 can be performed the power distribution device 105 or a cooling system 600 connected with the power distribution device 105. At least one ACT of the method 1100 can be performed by a vehicle. At least one ACT of the method 1100 can be performed by a manufacturing apparatus. At least one ACT of the method 1100 can be performed by a manufacturing individual. The method 1100 can include an ACT 1105 of providing a thermal component. The method 1100 can include an ACT 1110 of providing coolant. The method 1100 can include an ACT 1115 of cooling a busbar. The method 1100 can include an ACT 1120 of returning a coolant.

At ACT 1105, the method 1100 can include providing the thermal component 135. Providing the thermal component 135 can include providing a power distribution device 105 that includes the thermal component 135. Providing the thermal component 135 can include over-molding the thermal component 135 with the material 140. Providing the thermal component 135 can include providing a housing 115 to fix the thermal component 135 to or integrate the thermal component 135 with. Providing the thermal component 135 can include fixing a first outer side of the material 140 to a lateral wall of the housing 115. Providing the thermal component 135 can include fixing at least one busbar 120 to another outer side of the material 140.

Providing the thermal component 135 can include integrating the thermal component 135 within a lateral wall of the housing 115. For example, the housing 115 can be constructed by molding the thermal component 135 within a lateral wall of the housing 115. The busbar 120 can be fixed to the lateral wall including the thermal component 135. The busbar 120 can be in direct contact with the lateral wall including the thermal component 135 or spaced a distance from the lateral wall including the thermal component 135. The busbar 120 can be electrically isolated from the thermal component 135 by the material 140 molded over the thermal component 135. Providing the thermal component 135 can include providing an inlet 515 to receive coolant. The inlet 515 can receive coolant from the cooling system 600. Providing the thermal component 135 can include providing an outlet 520 to return coolant from the thermal component 135 back to the cooling system 600.

At ACT 1110, the method 1100 can include providing coolant. The coolant can be provided to the thermal component 135. For example, a pump 615 can transport coolant via at least one line 635 to the inlet 515 of the thermal component 135. The coolant can be provided to the thermal component 135 to cool the busbar 120 by dissipating heat generated at the busbar. The heat can be generated at the busbar 120 from conveyance of power between a battery and the vehicle component 125. The coolant can be provided by the cooling system 600 to the thermal component 135 after the coolant cools another component of a vehicle, e.g., after the coolant is passed through the vehicle thermal component 620. The coolant can be provided by the cooling system 600 to the vehicle thermal component 620 before the coolant is provided to cool the component of the vehicle, e.g., before the coolant is passed through the vehicle thermal component 620.

At ACT 1115, the method 1100 can including cooling the busbar 120. The coolant received at the inlet 515 can pass through a channel 510 of the thermal component 135. The channel 510 can be a vertically winding, horizontally winding, zig-zag, mini-channel, or any other type of channel. As the coolant passes through the channel 510, the coolant can absorb electrical waste heat from the busbar 120 created by the busbar 120 from conveying power between the vehicle component 125 and the battery pack 625, e.g., to charge the battery pack 625 or to power a load of the vehicle 905. The coolant can dissipate the heat generated at the busbar 120 by transporting the heat away from the busbar 120.

At ACT 1120, the method 1100 can include returning coolant. The coolant received at the inlet 515 of the thermal component 135 can be transported away from the thermal component 135 through the outlet 520 of the thermal component 135 and at least one line 635 of a cooling system 600. The coolant can be returned from the thermal component 135 by pressure created by the pump 615. The coolant can be transported from the outlet 520 to a heat exchanger 605. The heat exchanger 605 can dissipate the heat transported by the coolant into an environment, e.g., outside the vehicle 905 or into the vehicle 905 to heat the interior of the vehicle 905. The coolant can be stored in a coolant tank 610 before the coolant is pumped through the pump 615 back to the thermal component 135.

Figure 12:
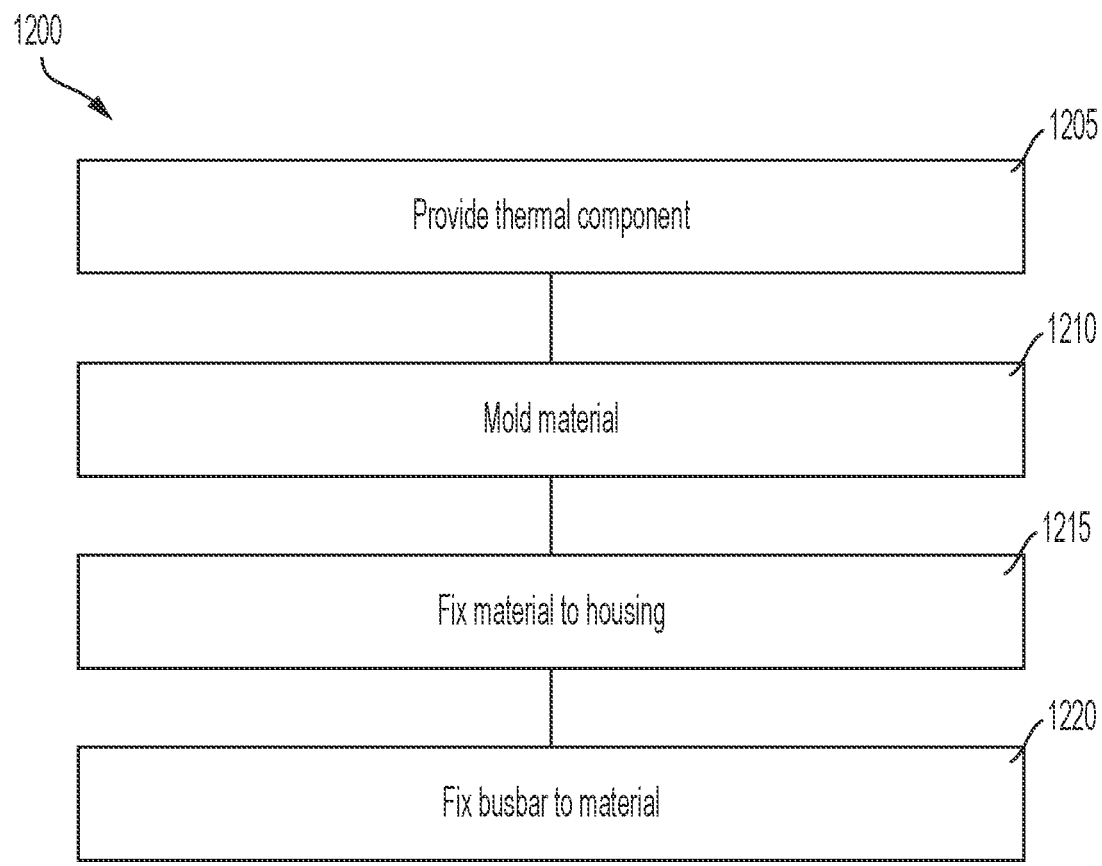
FIG. 12 is an example method of manufacturing a power distribution device.

FIG. 12 is an example method 1200 of manufacturing the power distribution device 105. At least one ACT of the method 1200 can be performed by a manufacturing apparatus. The manufacturing apparatus can include molds, injection molds, motors, mechanical components, conveyor belts, robotic arms, or a variety of other components to manufacture the power distribution device 105. At least one ACT of the method 1100 can be performed by a manufacturing individual. The method 1200 can include an ACT 1205 of providing a thermal component. The method 1200 can include an ACT 1210 of molding a material. The method 1200 can include an ACT 1215 of fixing the material to a housing. The method 1200 can include an ACT 1220 of fixing a busbar to the material. An exemplary method can combine ACTs of the method 1100 and the method 1200. For example, an exemplary method can include at least one ACT of the method 1100 and at least one ACT of the method 1200.

The method 1200 can include an ACT 1205 of providing the thermal component 135. Providing the thermal component 135 can include procuring the thermal component 135 and placing the thermal component 135 within a mold. The mold can include a cavity that the thermal component 135 can be inserted into. The cavity of the mold can be shaped as the lateral portion 110. The cavity of the mold can be shaped as the housing 115 or a portion of the housing 115, e.g., a lateral wall of the housing 115. The thermal component 135 can be inserted into a center of the cavity. The thermal component can be inserted into the cavity in an offset location, e.g., offset from a central location of the cavity.

At ACT 1210, the method 1200 can include molding the material 140. The material 140 can be inserted into the mold. The material 140 can be melted and inserted into the mold while the thermal component 135 is disposed in the mold. The material 140 can cover at least one surface of the thermal component 135. The material 140 can cover an entire outer surface of the thermal component 135. The material 140 can cover an exterior surface of at least one of a first lateral side, a second lateral side, a third lateral side, a fourth lateral side, a top side, or a bottom side of the thermal component 135. The material 140 can harden forming the lateral portion 110. Molding the material 140 over the thermal component 135 can create the lateral portion 110. Molding the material 140 over the thermal component 135 can create the housing 115 or at least one lateral wall of the housing 115, e.g., a lateral wall with the thermal component 135 integrated therewithin.

At ACT 1215, the method 1200 can include fixing the material 140 to the housing 115. For example, the lateral portion 110 can be fixed to the housing 115. A side of the lateral portion 110 can be fixed to the housing 115. For example, an outer surface of the portion 110 can be fixed to the housing 115. At least one leg 505 of the lateral portion 110 can be fixed to the housing 115. If the thermal component is integrated within a lateral wall of the housing 115, the lateral wall can be fixed to one or more other lateral walls of the housing 115. The material 140 can be fixed to the housing 115 via friction, via at least one snap, via at least one connector, via at least one bolt and nut, via at least one screw, via at least one pin-in-hole connector.

At ACT 1220, the method 1200 can include fixing a busbar 120 to the material 140. The busbar can be fixed to a side of the lateral portion 110. For example, the busbar 120 can be fixed to a side of the lateral portion 110 opposite a side of the lateral portion 110 fixed to the housing 115. The busbar 120 can be fixed to an outer surface of the lateral portion 110. The busbar 120 can be fixed to the material 140 of the lateral portion 110 via an adhesive, via at least one bolt and nut, at least one screw, via at least one snap, via at least one connector.

Figure 13:
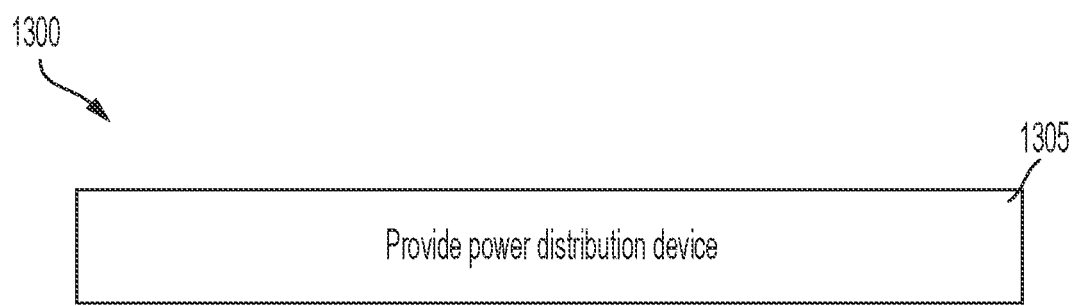
FIG. 13 is an example method of providing a power distribution device.

FIG. 13 is an example method 1300 of providing a power distribution device. The method 1300 can include an ACT 1305 of providing the power distribution device 105. The power distribution device 105 can include a housing 115. At least one contactor 210 can be disposed within the housing 115. The power distribution device 105 can be electrically connected with the battery pack 625, a load of the vehicle 905, and a charging source. The contactors 210 can switch power between the battery pack 625, a load of the vehicle 905, and a charging source. The power distribution device 105 can include the busbars 120 to make convey power between the battery pack 625, the load of the vehicle 905, and the charging source.

The power distribution device 105 can include a lateral portion 110 including a thermal component 135. The thermal component 135 can be disposed between the busbars 120 and a lateral wall of the housing 115. Coolant can flow through the thermal component 135 to dissipate heat generated at the busbars 120. The heat can be generated at the busbars 120 whole the busbars 120 convey power between the battery pack 625, the load of the vehicle 905, or the charging source. The lateral portion 110 can include the thermal component 135 over-molded with a material 140. The material 140 can be a non-conductive material, such as a plastic that covers at least one outer surface of the thermal component 135. The material 140 can prevent the busbars 120 and the thermal component 135 from touching or becoming into electrical communication. Furthermore, via the material 140, the lateral portion 110 can be fixed to the lateral wall of the housing 115. The busbars 120 can be fixed to lateral portion 110.

Figure 14:
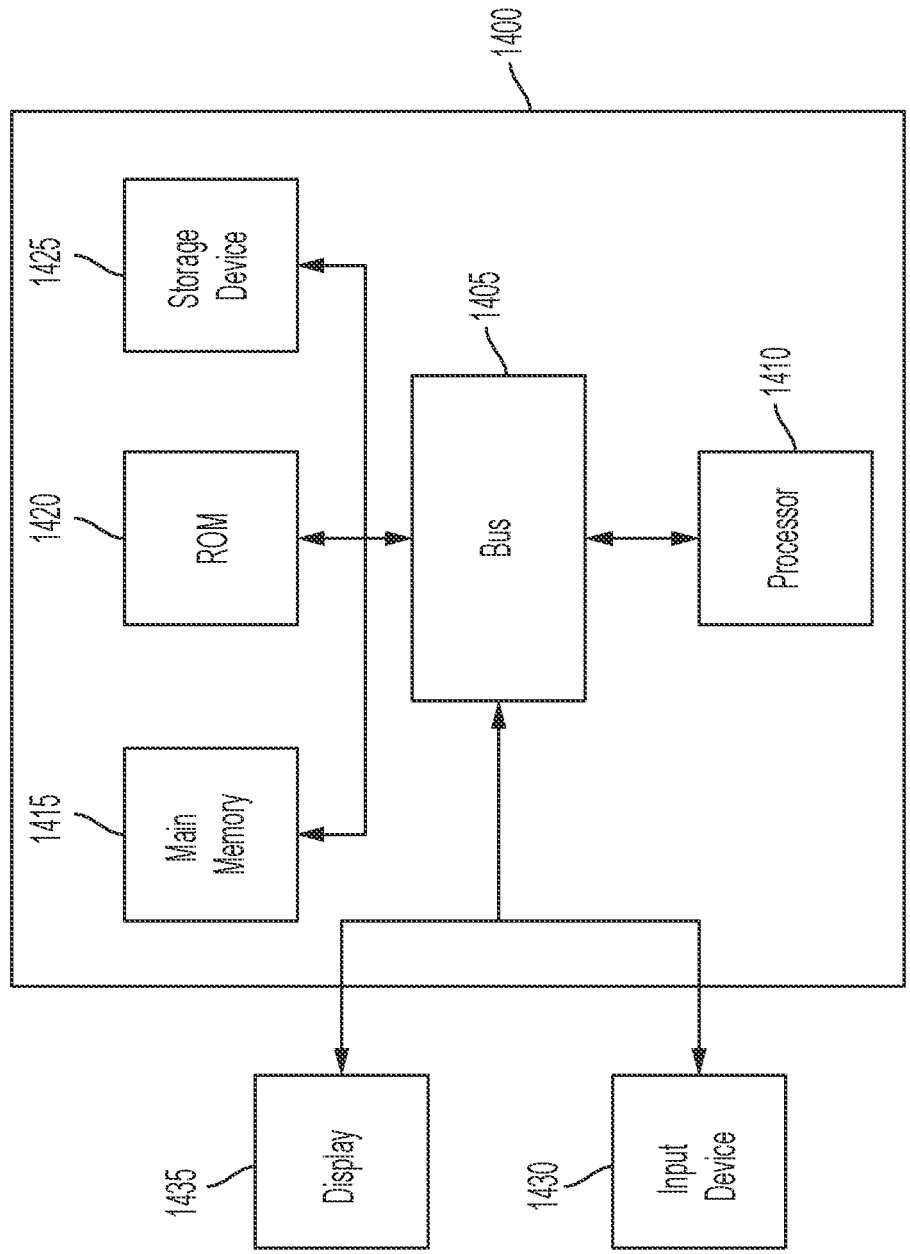
FIG. 14 is a block diagram illustrating an architecture for a computer system that can be employed to implement or use elements of the systems, components and methods described and illustrated herein.

FIG. 14 depicts an example block diagram of an example computer system 1400. The computer system, computing device, or computing apparatus 1400 can include or be used to implement a data processing system or its components. The computing system 1400 includes at least one bus 1405 or other communication component for communicating information and at least one processor 1410 or processing circuit coupled to the bus 1405 for processing information. The computing system 1400 can also include one or more processors 1410 or processing circuits coupled to the bus for processing information. The computing system 1400 also includes at least one main memory 1415, such as a random access memory (RAM) or other dynamic storage device, coupled to the bus 1405 for storing information, and instructions to be executed by the processor 1410. The main memory 1415 can be used for storing information during execution of instructions by the processor 1410. The computing system 1400 may further include at least one read only memory (ROM) 1420 or other static storage device coupled to the bus 1405 for storing static information and instructions for the processor 1410. A storage device 1425, such as a solid state device, magnetic disk or optical disk, can be coupled to the bus 1405 to persistently store information and instructions.

The computing system 1400 may be coupled via the bus 1405 to a display 1435, such as a liquid crystal display, or active matrix display, for displaying information to a user such as a driver of the electric vehicle 905 or other end user. An input device 1430, such as a keyboard or voice interface may be coupled to the bus 1405 for communicating information and commands to the processor 1410. The input device 1430 can include a touch screen display 1435. The input device 1430 can also include a cursor control, such as a mouse, a trackball, or cursor direction keys, for communicating direction information and command selections to the processor 1410 and for controlling cursor movement on the display 1435.

The processes, systems and methods described herein can be implemented by the computing system 1400 in response to the processor 1410 executing an arrangement of instructions contained in main memory 1415. Such instructions can be read into main memory 1415 from another computer-readable medium, such as the storage device 1425. Execution of the arrangement of instructions contained in main memory 1415 causes the computing system 1400 to perform the illustrative processes described herein. One or more processors in a multi-processing arrangement may also be employed to execute the instructions contained in main memory 1415. Hard-wired circuitry can be used in place of or in combination with software instructions together with the systems and methods described herein. Systems and methods described herein are not limited to any specific combination of hardware circuitry and software.

Although an example computing system has been described in FIG. 14, the subject matter including the operations described in this specification can be implemented in other types of digital electronic circuitry, or in computer software, firmware, or hardware, including the structures disclosed in this specification and their structural equivalents, or in combinations of one or more of them.

Some of the description herein emphasizes the structural independence of the aspects of the system components or groupings of operations and responsibilities of these system components. Other groupings that execute similar overall operations are within the scope of the present application. Modules can be implemented in hardware or as computer instructions on a non-transient computer readable storage medium, and modules can be distributed across various hardware or computer based components.

The systems described above can provide multiple ones of any or each of those components and these components can be provided on either a standalone system or on multiple instantiation in a distributed system. In addition, the systems and methods described above can be provided as one or more computer-readable programs or executable instructions embodied on or in one or more articles of manufacture. The article of manufacture can be cloud storage, a hard disk, a CD-ROM, a flash memory card, a PROM, a RAM, a ROM, or a magnetic tape. In general, the computer-readable programs can be implemented in any programming language, such as LISP, PERL, C, C++, C #, PROLOG, or in any byte code language such as JAVA. The software programs or executable instructions can be stored on or in one or more articles of manufacture as object code.

Example and non-limiting module implementation elements include sensors providing any value determined herein, sensors providing any value that is a precursor to a value determined herein, datalink or network hardware including communication chips, oscillating crystals, communication links, cables, twisted pair wiring, coaxial wiring, shielded wiring, transmitters, receivers, or transceivers, logic circuits, hard-wired logic circuits, reconfigurable logic circuits in a particular non-transient state configured according to the module specification, any actuator including at least an electrical, hydraulic, or pneumatic actuator, a solenoid, an op-amp, analog control elements (springs, filters, integrators, adders, dividers, gain elements), or digital control elements.

The subject matter and the operations described in this specification can be implemented in digital electronic circuitry, or in computer software, firmware, or hardware, including the structures disclosed in this specification and their structural equivalents, or in combinations of one or more of them. The subject matter described in this specification can be implemented as one or more computer programs, e.g., one or more circuits of computer program instructions, encoded on one or more computer storage media for execution by, or to control the operation of, data processing apparatuses. Alternatively or in addition, the program instructions can be encoded on an artificially generated propagated signal, e.g., a machine-generated electrical, optical, or electromagnetic signal that is generated to encode information for transmission to suitable receiver apparatus for execution by a data processing apparatus. A computer storage medium can be, or be included in, a computer-readable storage device, a computer-readable storage substrate, a random or serial access memory array or device, or a combination of one or more of them. While a computer storage medium is not a propagated signal, a computer storage medium can be a source or destination of computer program instructions encoded in an artificially generated propagated signal. The computer storage medium can also be, or be included in, one or more separate components or media (e.g., multiple CDs, disks, or other storage devices include cloud storage). The operations described in this specification can be implemented as operations performed by a data processing apparatus on data stored on one or more computer-readable storage devices or received from other sources.

The terms "computing device," "component," or "data processing apparatus" or the like encompass various apparatuses, devices, and machines for processing data, including by way of example a programmable processor, a computer, a system on a chip, or multiple ones, or combinations of the foregoing. The apparatus can include special purpose logic circuitry, e.g., an FPGA (field programmable gate array) or an ASIC (application specific integrated circuit). The apparatus can also include, in addition to hardware, code that creates an execution environment for the computer program in question, e.g., code that constitutes processor firmware, a protocol stack, a database management system, an operating system, a cross-platform runtime environment, a virtual machine, or a combination of one or more of them. The apparatus and execution environment can realize various different computing model infrastructures, such as web services, distributed computing and grid computing infrastructures.

A computer program (also known as a program, software, software application, app, script, or code) can be written in any form of programming language, including compiled or interpreted languages, declarative or procedural languages, and can be deployed in any form, including as a stand-alone program or as a module, component, subroutine, object, or other unit suitable for use in a computing environment. A computer program can correspond to a file in a file system. A computer program can be stored in a portion of a file that holds other programs or data (e.g., one or more scripts stored in a markup language document), in a single file dedicated to the program in question, or in multiple coordinated files (e.g., files that store one or more modules, sub programs, or portions of code). A computer program can be deployed to be executed on one computer or on multiple computers that are located at one site or distributed across multiple sites and interconnected by a communication network.

The processes and logic flows described in this specification can be performed by one or more programmable processors executing one or more computer programs to perform actions by operating on input data and generating output. The processes and logic flows can also be performed by, and apparatuses can also be implemented as, special purpose logic circuitry, e.g., an FPGA (field programmable gate array) or an ASIC (application specific integrated circuit). Devices suitable for storing computer program instructions and data can include non-volatile memory, media and memory devices, including by way of example semiconductor memory devices, e.g., EPROM, EEPROM, and flash memory devices; magnetic disks, e.g., internal hard disks or removable disks; magneto optical disks; and CD ROM and DVD-ROM disks. The processor and the memory can be supplemented by, or incorporated in, special purpose logic circuitry. The components of the system can be interconnected by any form or medium of digital data communication, e.g., a communication network. Examples of communication networks include a local area network ("LAN") and a wide area network ("WAN"), an internetwork (e.g., the Internet), and peer-to-peer networks (e.g., ad hoc peer-to-peer networks).

While operations are depicted in the drawings in a particular order, such operations are not required to be performed in the particular order shown or in sequential order, and all illustrated operations are not required to be performed. Actions described herein can be performed in a different order.

Having now described some illustrative implementations, it is apparent that the foregoing is illustrative and not limiting, having been presented by way of example. In particular, although many of the examples presented herein involve specific combinations of method acts or system elements, those acts and those elements may be combined in other ways to accomplish the same objectives. Acts, elements and features discussed in connection with one implementation are not intended to be excluded from a similar role in other implementations or implementations.

The phraseology and terminology used herein is for the purpose of description and should not be regarded as limiting. The use of "including" "comprising" "having" "containing" "involving" "characterized by" "characterized in that" and variations thereof herein, is meant to encompass the items listed thereafter, equivalents thereof, and additional items, as well as alternate implementations consisting of the items listed thereafter exclusively. In one implementation, the systems and methods described herein consist of one, each combination of more than one, or all of the described elements, acts, or components.

Any references to implementations or elements or acts of the systems and methods herein referred to in the singular may also embrace implementations including a plurality of these elements, and any references in plural to any implementation or element or act herein may also embrace implementations including only a single element. References in the singular or plural form are not intended to limit the presently disclosed systems or methods, their components, acts, or elements to single or plural configurations. References to any act or element being based on any information, act or element may include implementations where the act or element is based at least in part on any information, act, or element.

Any implementation disclosed herein may be combined with any other implementation or embodiment, and references to "an implementation," "some implementations," "one implementation" or the like are not necessarily mutually exclusive and are intended to indicate that a particular feature, structure, or characteristic described in connection with the implementation may be included in at least one implementation or embodiment. Such terms as used herein are not necessarily all referring to the same implementation. Any implementation may be combined with any other implementation, inclusively or exclusively, in any manner consistent with the aspects and implementations disclosed herein.

References to "or" may be construed as inclusive so that any terms described using "or" may indicate any of a single, more than one, and all of the described terms. References to at least one of a conjunctive list of terms may be construed as an inclusive OR to indicate any of a single, more than one, and all of the described terms. For example, a reference to "at least one of 'A' and 'B'" can include only 'A', only 'B', as well as both 'A' and 'B'. Such references used in conjunction with "comprising" or other open terminology can include additional items.

Where technical features in the drawings, detailed description or any claim are followed by reference signs, the reference signs have been included to increase the intelligibility of the drawings, detailed description, and claims. Accordingly, neither the reference signs nor their absence have any limiting effect on the scope of any claim elements.

Modifications of described elements and acts such as variations in sizes, dimensions, structures, shapes and proportions of the various elements, values of parameters, mounting arrangements, use of materials, colors, orientations can occur without materially departing from the teachings and advantages of the subject matter disclosed herein. For example, elements shown as integrally formed can be constructed of multiple parts or elements, the position of elements can be reversed or otherwise varied, and the nature or number of discrete elements or positions can be altered or varied. Other substitutions, modifications, changes and omissions can also be made in the design, operating conditions and arrangement of the disclosed elements and operations without departing from the scope of the present disclosure.

For example, descriptions of positive and negative electrical characteristics may be reversed. The thermal component described herein over-molded with a material, such as an electrically insulating material, can be implemented in a variety of different electrical systems or devices. For example, the thermal component over-molded with the material can be implemented in a drive motor, within a contactor, a battery cell, battery module, battery pack or other component of a vehicle. The thermal component over-molded with the material can structurally support and cool at least one heat generating component of a drive motor, within a contactor, a battery cell, battery module, battery pack or other component of a vehicle. Elements described as negative elements can instead be configured as positive elements and elements described as positive elements can instead by configured as negative elements. For example, elements described as having first polarity can instead have a second polarity, and elements described as having a second polarity can instead have a first polarity. Further relative parallel, perpendicular, vertical or other positioning or orientation descriptions include variations within +/−10% or +/−10 degrees of pure vertical, parallel or perpendicular positioning. References to "approximately," "substantially" or other terms of degree include variations of +/−10% from the given measurement, unit, or range unless explicitly indicated otherwise. Coupled elements can be electrically, mechanically, or physically coupled with one another directly or with intervening elements. Scope of the systems and methods described herein is thus indicated by the appended claims, rather than the foregoing description, and changes that come within the meaning and range of equivalency of the claims are embraced therein.

What is claimed is:

1. A device, comprising:
   a first busbar;
   a thermal component coupled to the first busbar to dissipate heat generated at the first busbar; and
   a material molded over at least one portion of the thermal component to electrically isolate the at least one portion of the thermal component from the first busbar, the thermal component over-molded with the material forming a lateral portion that forms a portion of a first lateral wall of a housing, the thermal component comprising a coolant channel formed by the first lateral wall of the housing.

2. The device of claim 1, comprising:
   the first busbar to transfer power from a battery; and
   the thermal component to dissipate the heat generated at the first busbar based at least on the power transferred from the battery.

3. The device of claim 1, comprising:
   the thermal component comprising:
      an inlet to receive coolant that dissipates the heat generated at the first busbar; and
      an outlet to pass the coolant out of the thermal component.

4. The device of claim 1, comprising:
   the housing comprising the first lateral wall; and
   the lateral portion forming the portion of the first lateral wall coupled to the first busbar.

5. The device of claim 1, comprising:
   the lateral portion comprising:
      the material molded over at least the portion of the thermal component, the material molded over an outer side of the thermal component interfacing with the first busbar to support the first busbar.

6. The device of claim 1, comprising:
   the lateral portion comprising:
      the thermal component;
      the material molded over at least a portion of an outer side of the thermal component; and
      wherein the material molded over at least the portion of the outer side of the thermal component forms an outer surface of the first lateral wall of the housing of the device to support the lateral portion.

7. The device of claim 1, comprising:
   a lateral portion comprising:
      the thermal component;
      the material; and
      at least one leg mounted to an outer surface of the material molded over the thermal component, the at least one leg configured to connect to an outer surface of a lateral wall of a housing of the device.

8. The device of claim 1, comprising:
   a second busbar to electrically connect the device to a component of a system;
   the thermal component disposed between the first busbar and the second busbar and disposed within the first lateral wall of the housing; and
   the thermal component interfacing with at least a portion of the first busbar to dissipate the heat generated at the first busbar.

9. The device of claim 1, comprising:
   the lateral portion comprising:
      the thermal component;
      the material;

a first portion of the lateral portion interfacing with the first busbar and forming the first lateral wall of housing of the device; and a second portion of the lateral portion interfacing with a second busbar and forming a second lateral wall of the housing to cool the second busbar.

10. The device of claim 1, comprising:

the lateral portion comprising:

a first portion of the lateral portion interfacing with the first busbar and forming the first lateral wall of the housing of the device, the first portion of the lateral portion comprising a first portion of the thermal component to cool the first busbar;

a second portion of the lateral portion interfacing with a second busbar of the device and forming a second lateral wall of the housing, the second portion of the lateral portion comprising a second portion of the thermal component to cool the second busbar; and a third portion of the lateral portion that is curved and positioned between the first portion of the lateral portion and the second portion of the lateral portion, the third portion of the lateral portion comprising a third portion of the thermal component that is curved and transports coolant between the first portion of the thermal component and the second portion of the thermal component.

11. The device of claim 1, the thermal component comprising:

an inlet to receive coolant from a first line of a system that transports the coolant to the thermal component; and an outlet to provide the coolant from the thermal component to a second line of the system that transports the coolant.

12. The device of claim 1, the thermal component comprising:

an inlet to receive coolant from a line of a vehicle that transports the coolant from a second thermal component of the vehicle to the thermal component.

13. The device of claim 1, the thermal component comprising:

a first lateral wall, a second lateral wall, a third lateral wall, a fourth lateral wall, a top portion, and a bottom portion; and wherein the material is molded over outer surfaces of the first lateral wall, the second lateral wall, the third lateral wall, the fourth lateral wall, the top portion, and the bottom portion.

14. A method, comprising:

providing a first busbar;

providing a thermal component coupled to the first busbar to dissipate heat generated at the first busbar; and providing a material to mold over at least a portion of the thermal component, wherein the material electrically isolates at least the portion of the thermal component from the first busbar, the portion of the thermal component over-molded with the material forming a lateral portion that forms a portion of a first lateral wall of a housing, the thermal component comprising a coolant channel formed by the first lateral wall of the housing.

15. The method of claim 14, comprising:

fixing the first busbar to the material molded over a first outer side of the thermal component to support the first busbar; and integrating the material molded over a second outer side of the thermal component to form an outer surface of the first lateral wall of the housing of a device to support the thermal component.

16. The method of claim 14, comprising:

receiving, by an inlet of the thermal component, coolant that dissipates the heat generated at the first busbar; and passing, by an outlet of the thermal component, the coolant out of the thermal component.

17. The method of claim 14, comprising:

providing the housing comprising the first lateral wall; and providing lateral portion interfacing with the first busbar and forming the first lateral wall of the housing, the lateral portion comprising the thermal component and the material.

18. A power distribution device, comprising:

a first busbar to convey power between a battery of a vehicle and a component of the vehicle to charge the battery of the vehicle or power a load of the vehicle via the battery of the vehicle;

a thermal component coupled to the first busbar to dissipate heat generated at the first busbar; and a material molded over at least a portion of the thermal component to electrically isolate at least the portion of the thermal component from the first busbar, the portion of the thermal component over-molded with the material forming a lateral portion that forms a portion of a first lateral wall of a housing of the power distribution device, the thermal component comprising a coolant channel formed by the first lateral wall of the housing.

19. The power distribution device of claim 18, comprising:

the lateral portion comprising:

a first portion interfacing with the first busbar and disposed within the first lateral wall of the housing, the first portion comprising a first portion of the thermal component to cool the first busbar; and a second portion that is curved comprising a second portion of the thermal component that is curved and transports coolant between the first portion of the thermal component and a third portion of the thermal component.

20. The power distribution device of claim 18, comprising:

the lateral portion comprising:

the material molded over at least the portion of the thermal component, the material molded over an outer side of the thermal component interfacing with the first busbar to support the first busbar.

\* \* \* \* \*